(12) United States Patent
Nishihara

(10) Patent No.: US 6,790,887 B1
(45) Date of Patent: Sep. 14, 2004

(54) AROMATIC POLYCARBONATE RESIN COMPOSITION

(75) Inventor: Hajime Nishihara, Yokohama (JP)

(73) Assignee: Asahi Kasei Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/717,060

(22) Filed: Nov. 22, 2000

Related U.S. Application Data

(63) Continuation-in-part of application No. 09/601,843, filed on Aug. 9, 2000, now abandoned, and a continuation-in-part of application No. PCT/JP00/00681, filed on Feb. 8, 2000.

(30) Foreign Application Priority Data

Feb. 8, 1999 (JP) ............................................ 11-030030
Nov. 19, 1999 (JP) ............................................ 11-329939

(51) Int. Cl.[7] ........................ C08L 69/00; C08L 83/04; C08K 5/5419
(52) U.S. Cl. ........................ 524/120; 524/101; 524/106; 524/116; 524/127; 524/147; 524/152; 524/161; 524/162; 524/165; 524/267; 524/268; 525/67; 525/92 A; 525/92 E; 525/101; 525/464
(58) Field of Search ................................. 524/101, 106, 524/116, 120, 127, 147, 152, 161, 162, 165, 267, 268; 525/67, 92 A, 92 E, 101, 464

(56) References Cited

U.S. PATENT DOCUMENTS

| | | | | |
|---|---|---|---|---|
| 3,751,519 A | * | 8/1973 | Bostick | |
| 3,971,756 A | * | 7/1976 | Bialous | |
| 4,115,354 A | * | 9/1978 | Mark | |
| 4,305,856 A | * | 12/1981 | Sakano | |
| 4,387,176 A | | 6/1983 | Frye | |
| 4,390,651 A | * | 6/1983 | Brown | |
| 4,391,935 A | * | 7/1983 | Bialous et al. ................. | 524/82 |
| 4,497,925 A | | 2/1985 | Abolins et al. | |
| 4,942,188 A | * | 7/1990 | Hamersma | |
| 4,983,545 A | * | 1/1991 | Gokan et al. | |
| 5,373,035 A | * | 12/1994 | Uemura | |
| 6,001,921 A | * | 12/1999 | Serizawa | |
| 6,111,016 A | * | 8/2000 | Katayama et al. ......... | 525/92 E |
| 6,433,050 B1 | * | 8/2002 | Shinomiya et al. ......... | 524/265 |

FOREIGN PATENT DOCUMENTS

| | | | |
|---|---|---|---|
| EP | 728811 | * | 8/1996 |
| JP | 63162756 | | 7/1988 |
| JP | 570680 | | 3/1993 |
| JP | 07-196871 | * | 8/1995 |
| JP | 09-087504 | * | 3/1997 |
| JP | 6341565 | | 2/1998 |
| JP | 10139964 A | | 5/1998 |
| JP | 11140294 A | | 5/1999 |
| WO | WO 99/28387 | * | 6/1999 |

OTHER PUBLICATIONS

Grant & Hackh's Chemical Dictionary, p. 531 5th Edition, Feb. 1990.*

* cited by examiner

Primary Examiner—David J. Buttner
(74) Attorney, Agent, or Firm—Birch, Stewart, Kolasch & Birch, LLP

(57) ABSTRACT

Disclosed is an aromatic polycarbonate resin composition comprising a resin component (A) selected from the group consisting of an aromatic polycarbonate and a resin mixture of an aromatic polycarbonate and at least one organic polymer resin other than an aromatic polycarbonate, wherein the resin mixture has an aromatic polycarbonate content of 50% by weight or more, and at least one aromatic group-containing silicone compound (B), wherein the at least one aromatic group-containing silicone compound (B) comprises a monomer, a polymer or a mixture thereof, which is represented by at least one formula selected from the group consisting of the following formulae (1) and (2):

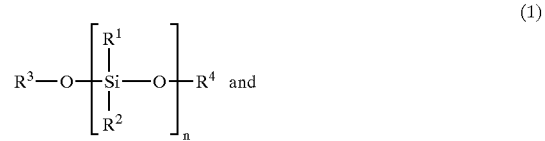

(1)

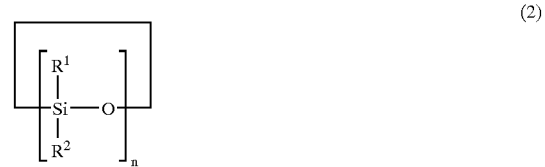

(2)

wherein the component (B) contains the aromatic group in an amount of 5 to 100 mole %, based on the total molar amount of $R^1$, $R^2$, $R^3$ and $R^4$, wherein each of $R^1$ and $R^2$ represents a hydrogen atom or a $C_1$–$C_{20}$ hydrocarbon group, and each of $R^3$ and $R^4$ represents a hydrogen atom, a $C_1$–$C_{20}$ hydrocarbon group or a metal-containing group.

7 Claims, No Drawings

US 6,790,887 B1

AROMATIC POLYCARBONATE RESIN COMPOSITION

This application is a Continuation-In-Part of PCT International Application No. PCT/JP00/00681 filed on Feb. 8, 2000, which designated the United States and on which priority is claimed under 35 U.S.C. §120, the entire contents of which are hereby incorporated by reference.

This application is a continuation-in-part of U.S. patent application Ser. No. 09/601,843 filed on Aug. 9, 2000, now abandoned.

BACKGROUND OF THE INVENTION

1. Field of the Invention

The present invention relates to an aromatic polycarbonate resin composition. More particularly, the present invention is concerned with an aromatic polycarbonate resin composition comprising (A) an aromatic polycarbonate or a resin mixture of an aromatic polycarbonate and at least one organic polymer resin other than an aromatic polycarbonate, and (B) at least one aromatic group-containing silicone compound selected from the group consisting of an aromatic group-containing silicone compound having a linear configuration and an aromatic group-containing silicone compound having a cyclic configuration, wherein the component (B) contains an aromatic group in a specific amount. The aromatic polycarbonate resin composition of the present invention has not only excellent flame retardancy, but also excellent melt fluidity and excellent melt-molding stability (i.e., substantially no variation or only small variation in the quality of shaped articles obtained by melt-molding). By molding the aromatic polycarbonate resin composition of the present invention, there can be obtained shaped articles having excellent mechanical properties, excellent light stability and excellent appearance.

2. Prior Art

Polycarbonates, which are light in weight and have excellent impact resistance, have been used in various fields, such as automobile parts, parts for use in household electric appliances and parts for use in office automation machines. However, polycarbonates are easily flammable, and the use of polycarbonates is limited due to their flammability.

As a method for imparting flame retardancy to resins, it is known to add thereto flame retardants, such as halogen-containing flame retardants, phosphorus-containing flame retardants and inorganic flame retardants. The objective of imparting flame retardancy to resins has been attained to some extent by the use of such flame retardants. However, the demand for improved safety in the accident of fire has increased in recent years. In accordance with the increasing demand, studies for developing improved techniques for imparting flame retardancy to resins have been made in the art. In addition, it has also been desired for these flame retardancy-imparting techniques to have advantages in that no environmental problem is posed or no lowering of the mechanical properties of resins is caused.

Techniques are also known of using organic silicon compounds as flame retardants for resins. For example, Unexamined Japanese Patent Application Laid-Open Specification No. 63-41565 discloses a smoke suppressant comprising a hydrocarbon, a silicone and zinc borate. U.S. Pat. Nos. 4,497,925 and 4,387,176 each discloses a flame retardant resin composition containing a di-methylsilicone. Each of the silicones described in the above-mentioned three prior art documents has an extremely small content of an aromatic group (less than 5 mole %). When such a flame retardant (containing a silicone having a low aromatic group content) is mixed with an aromatic group-containing resin to obtain a resin composition, a phase separation is likely to occur between the silicone and the resin due to a poor compatibility therebetween. As a result, when such a resin composition is molded to form a shaped article, a problem arises in that the mechanical properties of the shaped article, such as impact strength, are lowered. Therefore, these types of flame retardants are unsatisfactory for practical use.

Unexamined Japanese Patent Application Laid-Open Specification No. 63-162756 discloses a resin composition comprising an aromatic polycarbonate, a polyolefin and a silicone fluid, wherein the resin composition is described as exhibiting an improved abrasion resistance. However, the silicone described in this prior art document has a very low aromatic group content. Therefore, the resin composition disclosed in this prior art document has substantially the same problem as described above in connection with the above-mentioned Unexamined Japanese Patent Application Laid-Open Specification No. 63-41565 and U.S. Pat. Nos. 4,497,925 and 4,387,176.

Unexamined Japanese Patent Application Laid-Open Specification Nos. 10-139964 and 11-140294 each disclose a flame retardant aromatic polycarbonate resin composition containing a branched methylphenylsilicone and/or a crosslinked methylphenylsilicone. However, due to the branched and crosslinked structures thereof, the above-mentioned methylphenylsilicones exhibit poor compatibility with an aromatic polycarbonate resin. As a result, each of these branched and crosslinked methylphenylsilicones has a problem in that the dispersibility thereof in the resin composition is poor. Further, the aromatic polycarbonate resin composition disclosed in this prior art document has a problem in that the flame retardancy thereof is poor.

A methylphenylsilicone having no branched or crosslinked structure is known and used as an oil for a diffusion pump or a high temperature oil bath. However, with respect to this type of methylphenylsilicone, there has been no report suggesting that a polycarbonate resin composition having not only an excellent flame retardancy but also excellent mechanical properties has been obtained by the combined use of the above-mentioned silicone and an aromatic polycarbonate.

Further, as a combination of a silicone and a resin in other than a polycarbonate, a composition comprising a polyphenylene ether and a phenylsiloxane is known (see Unexamined Japanese Patent Application Laid-Open Specification No. 5-70680). In this composition, an aromatic group-containing polyorganosiloxane having a linear configuration is used as a flame retardant. However, since this composition employs a polyphenylene ether as a resin component, this composition has poor impact strength and poor light resistance. Therefore, this prior art technique gives no solution for the problems accompanying polycarbonate resins.

SUMMARY OF THE INVENTION

In this situation, the present inventor has made extensive and intensive studies with a view toward developing a polycarbonate resin composition which is free from the above-mentioned problems, specifically, a polycarbonate resin composition which is advantageous not only in that it has excellent flame retardancy, excellent melt fluidity and excellent melt-molding stability (i.e., substantially no variation or only small variation in the quality of shaped articles obtained by melt-molding), but also in that it can be used for producing a shaped article having excellent mechanical properties, excellent light stability and excellent appearance. As a result, it has unexpectedly been found that, by using at least one specific, aromatic group-containing silicone compound selected from the group consisting of an aromatic group-containing silicone compound having a linear configuration and an aromatic group-containing silicone compound having a cyclic configuration, wherein the silicone compound contains an aromatic group in a specific amount, not only can a great flame retardancy be imparted to an aromatic polycarbonate, but also the above-mentioned other properties of an aromatic polycarbonate can be improved. The present invention has been completed, based on this novel finding.

Accordingly, it is a primary object of the present invention to provide an aromatic polycarbonate resin composition which is advantageous not only in that it has excellent flame retardancy, excellent melt fluidity and excellent melt-molding stability (i.e., substantially no variation or only small variation in the quality of shaped articles obtained by melt-molding), but also in that it can be used for producing a shaped article having excellent mechanical properties, excellent light stability and excellent appearance.

The foregoing and other objects, features and advantages of the present invention will be apparent from the following detailed description and claims.

DETAILED DESCRIPTION OF THE INVENTION

According to the present invention, there is provided an aromatic polycarbonate resin composition comprising:

100 parts by weight of a resin component (A) selected from the group consisting of an aromatic polycarbonate and a resin mixture of an aromatic polycarbonate and at least one organic polymer resin other than an aromatic polycarbonate, wherein the resin mixture has an aromatic polycarbonate content of 50% by weight or more, and 0.1 to 100 parts by weight of at least one aromatic group-containing silicone compound (B), the at least one aromatic group-containing silicone compound (B) comprising a monomer, a polymer or a mixture thereof, which is represented by at least one formula selected from the group consisting of the following formulae (1) and (2):

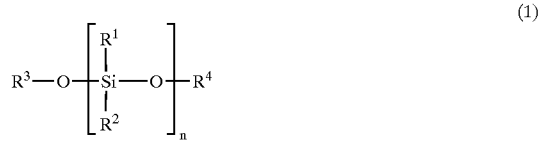

wherein:
  each of $R^1$ and $R^2$ independently represents sents a hydrogen atom or a monovalent $C_1$–$C_{20}$ hydrocarbon group;
  each of $R^3$ and $R^4$ independently represents a hydrogen atom; a monovalent $C_1$–$C_{20}$ hydrocarbon group; a metal-containing monovalent group comprising a metal atom having bonded thereto at least one member selected from the group consisting of a hydrogen atom and monovalent $C_1$–$C_{20}$ hydrocarbon groups; or a divalent $C_1$–$C_{20}$ hydrocarbon group, wherein, when each of $R^3$ and $R^4$ independently represents a divalent $C_1$–$C_{20}$ hydrocarbon group, $R^3$ and $R^4$ are bonded to each other to form a ring:
  at least one of $R^1$, $R^2$, $R^3$ and $R^4$ is a $C_6$–$C_{20}$ aromatic group having a valence according to the definition of $R^1$, $R^2$, $R^3$ or $R^4$; and n is 1 or more in terms of the number average n value, and

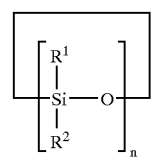

wherein each of $R^1$, $R^2$ and n is as defined for formula (1), wherein, when the component (B) is a polymer represented by formula (1) or (2) wherein n is 2 or more in terms of the number average n value, the recurring units, each represented by the following formula (3):

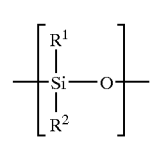

wherein each of $R^1$ and $R^2$ is as defined for formula (1), are the same or different, so that the polymer (B) is a homopolymer or a copolymer, wherein the copolymer has a random, a block or an alternating configuration, wherein, when each of $R^1$ and $R^2$ of formula (2) is a hydrogen atom or an aliphatic hydrocarbon group, at least a part of the component (B) is a compound represented by formula (1), and wherein the component (B) contains the aromatic group in an amount of 5 to 100 mole %, based on the total molar amount of $R^1$, $R^2$, $R^3$ and $R^4$.

For easy understanding of the present invention, the essential features and various preferred embodiments of the present invention are enumerated below.

1. An aromatic polycarbonate resin composition comprising:

100 parts by weight of a resin component (A) selected from the group consisting of an aromatic polycarbonate and a resin mixture of an aromatic polycarbonate and at least one organic polymer resin other than an aromatic polycarbonate, wherein the resin mixture has an aromatic polycarbonate content of 50% by weight or more, and 0.1 to 100 parts by weight of at least one aromatic group-containing silicone compound (B), the at least one aromatic group-containing silicone compound (B) comprising a monomer, a polymer or a mixture thereof, which is represented by at least one formula selected from the group consisting of the following formulae (1) and (2):

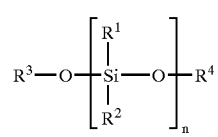

wherein:
  each of $R^1$ and $R^2$ independently represents a hydrogen atom or a monovalent $C_1$–$C_{20}$ hydrocarbon group;
  each of $R^3$ and $R^4$ independently represents a hydrogen atom; a monovalent $C_1$–$C_{20}$ hydrocarbon group; a metal-containing monovalent group comprising a metal atom having bonded thereto at least one member selected from the group consisting of a hydrogen atom and monovalent $C_1$–$C_{20}$ hydrocarbon groups; or a divalent $C_1$–$C_{20}$ hydrocarbon group, wherein, when each of $R^3$ and $R^4$ independently represents a divalent $C_1$–$C_{20}$ hydrocarbon group, $R^3$ and $R^4$ are bonded to each other to form a ring;

at least one of $R^1$, $R^2$, $R^3$ and $R^4$ is a $C_6$–$C_{20}$ aromatic group having a valence according to the definition of $R^1$, $R^2$, $R^3$ or $R^4$; and n is 1 or more in terms of the number average n value, and

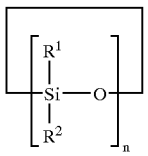

(2)

wherein each of $R^1$, $R^2$ and n is as defined for formula (1), wherein, when the component (B) is a polymer represented by formula (1) or (2) wherein n is 2 or more in terms of the number average n value, the recurring units, each represented by the following formula (3):

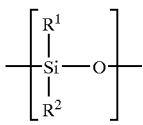

(3)

wherein each of $R^1$ and $R^2$ is as defined for formula (1), are the same or different, so that the polymer (B) is a homopolymer or a copolymer, wherein the copolymer has a random, a block or an alternating configuration, wherein, when each of $R^1$ and $R^2$ of formula (2) is a hydrogen atom or an aliphatic hydrocarbon group, at least a part of the component (B) is a compound represented by formula (1), and wherein the component (B) contains the aromatic group in an amount of 5 to 100 mole %, based on the total molar amount of $R^1$, $R^2$, $R^3$ and $R^4$.

2. The polycarbonate resin composition according to item 1 above, wherein the metal-containing monovalent group as at least one of $R^3$ and $R^4$ is represented by the formula:

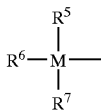

wherein M represents a tetravalent metal atom, and each of $R^5$, $R^6$ and $R^7$ independently represents a hydrogen atom or a monovalent $C_1$–$C_{20}$ hydrocarbon group.

3. The polycarbonate resin composition according to item 2 above, wherein M represents a silicon atom.

4. The polycarbonate resin composition according to any one of items 1 to 3 above, wherein the component (B) exhibits a kinematic viscosity of 100 centistokes or more as measured at 25° C. in accordance with JIS-K2410.

5. The polycarbonate resin composition according to any one of items 1 to 3 above, wherein the component (B) comprises a mixture of:

a silicone compound containing the aromatic group in an amount of from 5 to less than 50 mole %, based on the total molar amount of $R^1$, $R^2$, $R^3$ and $R^4$, and a silicone compound containing the aromatic group in an amount of 50 mole % or more, based on the total molar amount of $R^1$, $R^2$, $R^3$ and $R^4$.

6. The polycarbonate resin composition according to any one of items 1 to 3 above, which further comprises 0.001 to 100 parts by weight of a flame retardant (C).

7. The polycarbonate resin composition according to item 6 above, wherein the flame retardant (C) comprises at least one flame retardant selected from the group consisting of a metal salt flame retardant, a phosphorus-containing flame retardant, a nitrogen-containing flame retardant, a silicon-containing flame retardant other than the silicone compound (B), an inorganic flame retardant and a fibrous flame retardant.

8. The polycarbonate resin composition according to item 7 above, wherein the fibrous flame retardant is at least one flame retardant selected from the group consisting of a fluorine-containing flame retardant and a glass fiber.

9. The polycarbonate resin composition according to item 7 above, wherein the metal salt flame retardant comprises a metal salt of an organic sulfur compound.

10. The polycarbonate resin composition according to item 9 above, wherein the metal salt of an organic sulfur compound is an organic sulfonic acid metal salt.

11. The polycarbonate resin composition according to item 7 above, wherein the metal salt flame retardant comprises an aromatic organic polymer containing a sulfonic acid metal salt.

12. The polycarbonate resin composition according to item 7 above, wherein the nitrogen-containing flame retardant comprises at least one compound selected from the group consisting of a triazine compound, a triazole compound, a tetrazole compound, a phosphazene compound and a diazo compound.

13. The polycarbonate resin composition according to item 1 above, wherein the resin component (A) is a resin mixture of an aromatic polycarbonate and at least one organic polymer resin selected from the group consisting of aromatic vinyl polymers, olefin polymers, polyesters, polyamides, polyphenylene ethers and epoxy polymers.

Hereinbelow, the present invention is described in detail.

The aromatic polycarbonate resin composition of the present invention comprises 100 parts by weight of a resin component (A) selected from the group consisting of an aromatic polycarbonate and a resin mixture of an aromatic polycarbonate and at least one organic polymer resin other than an aromatic polycarbonate, wherein the resin mixture has an aromatic polycarbonate content of 50% by weight or more, and 0.1 to 100 parts by weight of at least one aromatic group-containing silicone compound (B) selected from the group consisting of an aromatic group-containing silicone compound having a linear configuration and an aromatic group-containing silicone compound having a cyclic configuration, wherein the component (B) contains an aromatic group in a specific amount.

The above-mentioned-component (B) not only acts as a flame retardant for the above-mentioned resin component (A) but also imparts excellent melt fluidity and excellent melt-molding stability (i.e., substantially no variation or only small variation in the quality of shaped articles obtained by melt-molding) to the resin composition of the present invention and improves the mechanical properties, light stability and appearance of the shaped articles obtained by molding the aromatic polycarbonate resin composition of the present invention.

With respect to the function of component (B) as a flame retardant, it is believed that, immediately after the start of burning of the resin composition of the present invention (especially when it is in the form of a shaped article), a film of silica derived from component (B) is formed on the surface of the resin composition, and this silica film improves the flame retardancy of resin component (A).

The flame retardancy of resin component (A) can be greatly improved by component (B). The mechanism of the great improvement of the flame retardancy of resin component (A) by component (B) is presumed to be as follows.

Component (B) contains an aromatic group. For this reason, component (B) exhibits a good compatibility with resin component (A), so that, in the resin composition of the present invention, component (B) is finely dispersed in resin component (A), thereby greatly improving the flame retardancy of resin component (A).

Further, component (B) is an aromatic group-containing silicone compound selected from the group consisting of an aromatic group-containing silicone compound having a linear configuration and an aromatic group-containing silicone compound having a cyclic configuration, and, hence, component (B) has no branched or crosslinked structure. For this reason, when a shaped article obtained by molding the aromatic polycarbonate resin composition of the present invention begins to burn, the movement of the molecules of component (B) is greatly promoted, so that the compatibility of component (B) with resin component (A) is further improved. As a result, the reaction of siloxane groups in component (B) with carbonate groups in resin component (A) is accelerated, thereby effectively suppressing the burning of resin component (A).

The silicon atom of component (B) is an element which has a low surface energy. Therefore, in the shaped article obtained by molding the aromatic polycarbonate resin composition of the present invention, the location of component (B) is biased toward the surface portion thereof. In addition, component (B) comprises a compound which has a linear configuration and/or a compound which has a cyclic configuration, and, hence, component (B) has no branched or crosslinked structure. Therefore, the movement of component (B) to the surface portion of the shaped article is promoted. As a result, when the shaped article obtained by molding the aromatic polycarbonate resin composition of the present invention begins to burn, the concentration of component (B) in the surface portion of the shaped article becomes high, so that the shaped article exhibits excellent flame retardancy.

When the shaped article satisfies the following formula:

$$2 \leq C^1/C^2 \leq 100$$

wherein $C^1$ (%) represents the average concentration of the silicon atoms in the surface portion of the shaped article of from the surface to the depth of 50 Å (angstrom) (5 nm), as measured by X-ray photoelectron spectroscopy, and $C^2$ (%) represents the average concentration of the silicon atoms in the whole shaped article as measured by X-ray fluorescence analysis, the shaped article exhibits especially excellent flame retardancy.

The aromatic polycarbonate (hereinbelow, frequently referred to as "PC") as resin component (A) in the present invention is selected from aromatic homopolycarbonates and aromatic copolycarbonates (wherein the aromatic homopolycarbonate is produced using a single type of a bifunctional phenolic compound and an aromatic copolycarbonate is produced using a plurality of different types of bifunctional phenolic compounds).

Examples of methods for producing PC include a phosgene method in which phosgene is blown into a bifunctional phenolic compound in the presence of caustic alkali and a solvent, and a transesterification method in which, for example; a bifunctional phenolic compound and diethyl carbonate are subjected to transesterification in the presence of a catalyst.

Examples of bifunctional phenolic compounds include 2,2'-bis(4-hydroxyphenyl)propane, 2,2'-bis(4-hydroxy-3,5-dimethylphenyl)propane, bis(4-hydroxyphenyl)methane, 1,1'-bis(4-hydroxyphenyl)ethane, 2,2'-bis(4-hydroxyphenyl)butane, 2,2'-bis(4-hydroxy-3,5-diphenyl)butane, 2,2'-bis(4-hydroxy-3,5-dipropylphenyl)propane, 1,1'-bis(4-hydroxyphenyl)cyclohexane, and 1-phenyl-1,1'-bis(4-hydroxyphenyl)ethane. 2,2'-bis(4-hydroxyphenyl)propane (i.e., bisphenol A) is particularly preferred. As mentioned above, in the present invention, bifunctional phenolic compounds can be used individually or in combination.

A preferred range of the viscosity average molecular weight of the PC is from 10,000 to 100,000. The viscosity average molecular weight of the PC can be measured by gel permeation chromatography.

With respect to the above-mentioned resin mixture of PC and at least one organic polymer resin other than PC, which is used as resin component (A), the resin mixture has a PC content of 50% by weight or more, preferably 70% by weight or more.

Examples of organic polymer resins other than PC include thermoplastic resins other than PC, rubber polymers, thermosetting resins and the like. Among these resins, preferred are thermoplastic resins other than PC, and rubber polymers. Especially preferred are thermoplastic resins other than PC.

There is no particular limitation with respect to the above-mentioned thermoplastic resins other than PC, as long as the thermoplastic resins and PC are mutually, homogeneously dispersible. Examples of such thermoplastic resins include aromatic vinyl polymers, polyphenylene ethers, olefin polymers, vinyl chloride polymers, polyamides, polyesters, polyphenylene sulfides, polymethacrylates and epoxy polymers. These thermoplastic resins can be used individually or in combination. It is preferred to use at least one thermoplastic resin selected from the group consisting of aromatic vinyl polymers, olefin polymers, polyesters, polyamides, polyphenylene ethers and epoxy polymers.

The above-mentioned aromatic vinyl polymer which can be used in the resin mixture as resin component (A) is a rubber-modified aromatic vinyl polymer and/or a non-rubber-modified aromatic vinyl polymer, preferably a rubber-modified aromatic vinyl polymer or a mixture of a rubber-modified aromatic vinyl polymer and a non-rubber-modified aromatic vinyl polymer. With respect to the aromatic vinyl polymer, there is no particular limitation, as long as the aromatic vinyl polymer and PC are mutually, homogeneously dispersible.

A rubber-modified aromatic vinyl polymer is a polymer having a structure in which a dispersion phase comprised of a particulate rubber component for modification is dispersed in a continuous phase comprised of an aromatic vinyl polymer. A rubber-modified aromatic vinyl polymer can be obtained by graft-polymerizing an aromatic vinyl monomer and optionally a vinyl comonomer copolymerizable with the aromatic vinyl monomer, on a rubber component for modification, using a customary method, such as a bulk polymerization method, an emulsion polymerization method or a suspension polymerization method.

Examples of rubber-modified aromatic vinyl polymers include the so-called high impact polystyrene (hereinafter, frequently referred to as "HIPS"), ABS polymer (acrylonitrile/butadiene/styrene copolymer), AAS polymer (acrylonitrile/acrylic rubber/styrene copolymer), AES polymer (acrylonitrile/ethylene-propylene rubber/styrene copolymer) and the like.

With respect to the above-mentioned rubber component for modification which is used in the production of a rubber-modified aromatic vinyl polymer, it is preferred that the rubber component for modification has a glass transition temperature (Tg) of −30° C. or lower. If the rubber component for modification has a glass transition temperature higher than −30° C., the improvement in impact resistance may be unsatisfactory in some cases. The glass transition temperature (Tg) of the rubber component for modification can be measured by the differential scanning calorimetry (DSC) described in "Polymer Handbook" (edited by J. Brandrup, A Wiley-Interscience Publication, John Wiley & Sons, New York (1975)).

Examples of suitable rubber components for modification include diene rubbers, such as polybutadiene, poly(styrene-butadiene) and poly(acrylonitrile-butadiene); saturated rubbers obtained by hydrogenating the diene rubbers mentioned above; an isoprene rubber; a chloroprene rubber; acrylic rubbers, such as polybutyl acrylate; an ethylene/propylene copolymer rubber; an ethylene/propylene/diene terpolymer (EPDM); and an ethylene/octene copolymer rubber. Diene rubbers are particularly preferred.

Preferred examples of aromatic vinyl monomers which are graft-polymerizable with the rubber component for modification include styrene, α-methylstyrene and p-methylstyrene. Styrene is most preferred, but styrene can be used for copolymerization in combination with other aromatic vinyl monomers mentioned above.

If desired, at least one comonomer copolymerizable with the aromatic vinyl monomer can be introduced into the rubber-modified aromatic vinyl polymer. For obtaining a rubber-modified aromatic vinyl copolymer having excellent oil resistance, as a comonomer copolymerizable with the aromatic vinyl monomer, an unsaturated nitrile monomer, such as acrylonitrile or methacrylonitrile, can be used. Also, for lowering the melt viscosity of the aromatic vinyl monomer, an acrylate comonomer having an alkyl group having 1 to 8 carbon atoms can be used as a comonomer. Further, for improving the heat resistance of a final resin composition, other comonomers, such as acrylic acid, methacrylic acid, maleic anhydride and N-substituted maleimide or the like, can be used as a comonomer. In addition, the heat resistance of a final resin composition can also be improved by using α-methylstyrene as at least a part of the aromatic vinyl monomer for producing the rubber-modified aromatic vinyl copolymer.

When the aromatic vinyl monomer is used in the form of a mixture with a comonomer copolymerizable therewith, the amount of the comonomer in the mixture (to be graft-polymerized on the rubber component for modification) is generally in the range of from 0 to 40% by weight.

In the present invention, the content of the rubber component for modification in the rubber-modified aromatic vinyl polymer is preferably in the range of from 5 to 80% by weight, more preferably from 10 to 50% by weight. The content of the aromatic vinyl polymer component in the rubber-modified aromatic vinyl polymer is preferably in the range of from 95 to 20% by weight, more preferably from 90 to 50% by weight. When the ratio of the rubber component for modification to the aromatic vinyl polymer component in the rubber-modified aromatic vinyl polymer is within the above-mentioned range, a good balance of impact resistance and stiffness can be achieved with respect to an ultimate shaped article. The average diameter of the rubber particles in the rubber-modified aromatic vinyl polymer is preferably from 0.1 to 5.0 μm, more preferably from 0.2 to 3.0 μm. When the average rubber particle diameter is within the above-mentioned range, the impact resistance of the shaped article (obtained by molding the resin composition of the present invention) is particularly enhanced.

With respect to the rubber-modified aromatic vinyl polymer, the reduced viscosity $\eta_{sp}/C$ (as measured in a 0.5 g/dl solution at 30° C.), which is a yardstick of the molecular weight, is preferably in the range of from 0.30 to 0.80 dl/g, more preferably from 0.40 to 0.60 dl/g, wherein, when the aromatic vinyl polymer is a polystyrene resin, toluene is used as the solvent and, when the aromatic vinyl polymer is an unsaturated nitrile/aromatic vinyl copolymer, methyl ethyl ketone is used as the solvent. In the production of the rubber-modified aromatic vinyl polymer, the reduced viscosity $\eta_{sp}/C$ can be controlled by selecting the type and amount of the initiator, the polymerization temperature and the amount of the chain transfer agent.

When it is especially desired to achieve an excellent heat resistance and an excellent oil resistance, it is preferred that the above-mentioned aromatic vinyl polymer used as an organic polymer resin other than PC is a syndiotactic styrene polymer, which is a crystalline styrene polymer. As compared to an ordinary, atactic styrene polymer which is amorphous, a syndiotactic styrene polymer has excellent heat resistance and chemical resistance. However, a syndiotactic styrene polymer is brittle and has poor impact resistance. The term "syndiotactic styrene polymer" means a styrene polymer having a syndiotactic stereochemical structure, i.e., a stereochemical structure wherein, in the main chain formed by carbon-carbon bonds, the orientations of the pendant phenyl groups are alternating. The tacticity is determined by a nuclear magnetic resonance method in which a carbon isotope $^{13}C$ is detected ($^{13}C$-NMR method).

Examples of aromatic vinyl polymers include polystyrene, poly(alkylstyrene), poly(halogenated styrene), poly(alkoxystyrene), poly(vinylbenzoic acid) and mixtures thereof, and copolymers containing the above aromatic vinyl monomers as main components. Examples of poly(alkylstyrene) include poly(methylstyrene), poly(ethylstyrene), poly(isopropylstyrene), poly(tertiary butylstyrene) and the like. Examples of poly(halogenated styrene) include poly(chlorostyrene), poly(bromostyrene), poly(fluorostyrene) and the like. Examples of poly(alkoxystyrene) include poly(methoxystyrene), poly(ethoxystyrene) and the like. Especially preferred are polystyrene, poly(p-methylstyrene), poly(m-methylstyrene), poly(p-tertiary butylstyrene), poly(p-chrolostyrene), poly(m-chrolostyrene), poly(p-fluorostyrene) and a copolymer of styrene and p-methylstyrene.

Among aromatic vinyl polymers, preferred are a HIPS (high impact polystyrene) and an ABS (acrylonitrile-butadiene-styrene copolymer) resin. When a HIPS is used as an aromatic vinyl polymer, from the view-point of improving the compatibility of the HIPS With an aromatic polycarbonate, it is preferred that a styrene copolymer is used as a compatibility agent. For example, it is preferred that the styrene copolymer described in WO 95-35346 is used as such a compatibility agent.

Specific examples of polyphenylene ethers (herein-below, frequently referred to as "PPE"), which can be used in the resin mixture as resin component (A) include poly(2,6-dimethyl-1,4-phenylene ether), a copolymer of 2,6-dimethylphenol and 2,3,6-trimethylphenol, and the like. Of them, poly(2,6-dimethyl-1,4-phenylene ether) is preferred.

The method for producing such PPE is not particularly limited. For example, PPE can be readily produced by the method described in U.S. Pat. No. 3,306,874, in which, for example, 2,6-xylenol is subjected to oxidative polymerization, using as a catalyst a complex of copper (I) salt and an amine. Further, PPE can also be readily produced by other methods described, for example, in U.S. Pat. No. 3,306,875, U.S. Pat. No. 3,257,357, U.S. Pat. No. 3,257,358, Examined Japanese Patent Application Publication No. 52-17880, and Unexamined Japanese Patent Application Laid-Open Specification No. 50-51197. The reduced viscosity $\eta_{sp}/C$ (as measured in a 0.5 g/dl chloroform solution at 30° C.) of the PPE used in the present invention is preferably in the range of from 0.20 to 0.70 dl/g, more preferably from 0.30 to 0.60 dl/g. As a method for achieving the above-mentioned range of reduced viscosity of the polyphenylene ether, a method in which the amount of a catalyst used in the production of the polyphenylene ether is appropriately chosen can be mentioned.

As preferred examples of olefin polymers which can be used as an organic polymer resin other than PC in the resin mixture as resin component (A), there can be mentioned propylene polymers. Examples of propylene polymers include isotactic polypropylenes (isotactic homopolymers of propylene) and isotactic copolymers (inclusive of block copolymers and random copolymers) of propylene with an α-olefin, such as ethylene, 1-butene, 1-pentene or 1-hexene.

As an especially preferred example of olefin polymers, there can be mentioned a partially or completely crosslinked thermoplastic polymer which is obtained by subjecting a mixture of a crosslinkable rubber component and an olefin polymer to a dynamic crosslinking treatment wherein the mixture is melt-kneaded in the presence of, for example, a crosslinking agent and an auxiliary crosslinking agent.

Examples of crosslinkable rubber components include ethylene/α-olefin copolymers and hydrogenated diene rubbers.

Among ethylene/α-olefin copolymers, a copolymer of ethylene with a $C_3$–$C_{20}$ α-olefin is preferred. Especially preferred is an ethylene/a $C_6$–$C_{12}$ α-olefin copolymer produced using a metallocene catalyst, because such copolymer has a narrow molecular weight distribution.

On the other hand, among hydrogenated diene rubbers, preferred is a hydrogenated diene rubber which is a random copolymer, wherein 50% or more of all double bonds of the diene monomer units are hydrogenated. It is more preferred that the hydrogenated diene rubber is a random copolymer, wherein 90% or more of all double bonds of the diene monomer units are hydrogenated, and wherein the amounts of unhydrogenated 1,2-vinyl bonds and unhydrogenated 1,4-bonds are, respectively, not greater than 5% and not greater than 5%, based on all double bonds of the diene monomer units. The diene rubber may contain aromatic vinyl monomer units.

When a rubber polymer is used as the organic polymer resin other than an aromatic polycarbonate (PC) in the resin mixture as resin component (A), it is preferred that the rubber polymer has a glass transition temperature (Tg) of −30° C. or lower. If the rubber polymer has a glass transition temperature higher than −30° C., the improvement in the impact resistance may be unsatisfactory in some cases.

Examples of suitable rubber polymers include diene rubbers, such as polybutadiene, poly(styrene-butadiene) and poly(acrylonitrile-butadiene); saturated rubbers obtained by hydrogenating the diene rubbers mentioned above; an isoprene rubber; a chloroprene rubber; acrylic rubbers, such as polybutyl acrylate an ethylene/propylene copolymer rubber; an ethylene/propylene/diene terpolymer (EPDM); and an ethylene/octene copolymer rubber (each in the form of a crosslinked or non-crosslinked rubber), and thermoplastic elastomers containing at least one of the rubber polymers enumerated above.

As the above-mentioned thermoplastic elastomers, especially preferred is a thermoplastic, aromatic vinyl elastomer. Examples of such thermoplastic, aromatic vinyl elastomers include a block copolymer comprised of aromatic vinyl monomer units and conjugated diene monomer units and a hydrogenated or epoxidated block copolymer obtained by partially hydrogenating or partially epoxidating the conjugated diene moiety of the above block copolymer. By the addition of the above-mentioned thermoplastic elastomer to PC, the problem that a large-thickness shaped article produced from PC has a low impact strength can be solved. In this case, the impact strength can be further improved by the addition of the above-mentioned styrene copolymer as a compatibility agent.

Examples of aromatic vinyl monomers usable for forming aromatic vinyl monomer units in the above-mentioned block copolymer include styrene, α-methylstyrene, p-methylstyrene, p-chlorostyrene, p-bromostyrene, 2,4,5-tribromostyrene and the like. Styrene is most preferred, but styrene may be copolymerized with other aromatic vinyl monomers mentioned above.

As examples of conjugated diene monomers usable for forming conjugated diene monomer units in the above-mentioned block copolymer, 1,3-butadiene, isoprene and the like can be mentioned.

With respect to the block configuration of the above-mentioned block copolymer, the block copolymer is preferably a linear block copolymer having a configuration of, for example, SB, $S(BS)_n$ (wherein n represents an integer of from 1 to 3) or $S(BSB)_n$ (wherein n represents an integer of 1 or 2), or a star-shaped block copolymer having a configuration of $(SB)_nX$, wherein the B moieties form a linkage center portion. In $(SB)_nX$, n represents an integer of from 3 to 6. In the above configurations, S represents a polymer block comprised of aromatic vinyl monomer units, B represents a polymer block comprised of conjugated diene monomer units and/or a partial hydrogenation product thereof, X represents a coupling agent residue (e.g., silicon tetrachloride, tin tetrachloride, or a polyepoxy compound). Among them, linear block copolymers having a diblock configuration "SB", a triblock configuration "SBS", and a tetrablock configuration "SBSB" are preferred.

When the composition of the present invention is desired to exhibit an especially high melt fluidity, it is preferred to use a thermoplastic resin as the organic polymer resin other than PC in the resin mixture as component (A). Examples of such thermoplastic resins include polybutylene terephthalate, polyethylene terephthalate, thermoplastic epoxy polymers and polyamides.

Examples of thermosetting resins usable as the organic polymer resin other than PC in the resin mixture as component (A) include phenolic resins, amino resins, melamine resins, imido resins and epoxy resins.

It is preferred that the organic polymer resin other than PC has a weight average molecular weight of from 50,000 to 1,000,000, more advantageously from 100,000 to 500,000.

As an especially preferred example of resin mixtures as resin component (A), there can be mentioned a mixture of PC and an aromatic vinyl polymer.

The aromatic group-containing silicone compound (B) comprises a monomer, a polymer or a mixture thereof, which is represented by at least one formula selected from the group consisting of the following formulae (1) and (2):

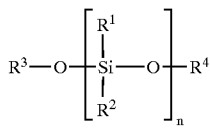

(1)

wherein:
each of $R^1$ and $R^2$ independently represents a hydrogen atom or a monovalent $C_1$–$C_{20}$ hydrocarbon group;
each of $R^3$ and $R^4$ independently represents a hydrogen atom; a monovalent $C_1$–$C_{20}$ hydrocarbon group; a metal-containing monovalent group comprising a metal atom having bonded thereto at least one member selected from the group consisting of a hydrogen atom and monovalent $C_1$–$C_{20}$ hydrocarbon groups; or a divalent $C_1$–$C_{20}$ hydrocarbon group, wherein, when each of $R^3$ and $R^4$ independently represents a divalent $C_1$–$C_{20}$ hydrocarbon group, $R^3$ and $R^4$ are bonded to each other to form a ring;
at least one of $R^1$, $R^2$, $R^3$ and $R^4$ is a $C_6$–$C_{20}$ aromatic group having a valence according to the definition of $R^1$, $R^2$, $R^3$ or $R^4$; and
n is 1 or more in terms of the number average n value, and

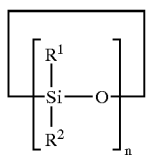

(2)

wherein each of $R^1$, $R^2$ and n is as defined for formula (1).

When the component (B) is a polymer represented by formula (1) or (2) wherein n is 2 or more in terms of the number average n value, the recurring units, each represented by the following formula (3):

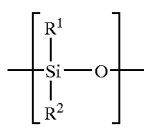

(3)

wherein each of $R^1$ and $R^2$ is as defined for formula (1), are the same or different, so that the polymer (B) is a homopolymer or a copolymer, wherein the copolymer has a random, a block or an alternating configuration.

When each of $R^1$ and $R^2$ of formula (2) is a hydrogen atom or an aliphatic hydrocarbon group, at least a part of the component (B) is a compound represented by formula (1).

The component (B) contains the aromatic group in an amount of 5 to 100 mole %, based on the total molar amount of $R^1$, $R^2$, $R^3$ and $R^4$.

When component (B) includes a compound represented by formula (1) wherein at least one of $R^3$ and $R^4$ independently represents a metal-containing monovalent group comprising a metal atom having bonded thereto at least one member selected from the group consisting of a hydrogen atom and monovalent $C_1$–$C_{20}$ hydrocarbon groups, the heat stability of the resin composition is improved. From the viewpoint of improving the heat stability, it is more preferred that the metal-containing monovalent group as at least one of $R^3$ and $R^4$ is represented by the formula:

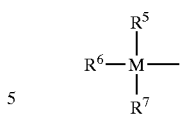

wherein M represents a tetravalent metal atom, and each of $R^5$, $R^6$ and $R^7$ independently represents a hydrogen atom or a monovalent $C_1$–$C_{20}$ hydrocarbon group.

Examples of tetravalent metal atoms used as M in the above formula include a silicon atom, a germanium atom, a tin atom and a lead atom. It is referred that the metal atom (M) in the above formula is a silicon atom. It is especially preferred that at least one of $R^3$ and $R^4$ of formula (1) independently represents a triorganosilyl group —$SiR^5R^6R^7$, wherein each of $R^5$, $R^6$ and $R^7$ independently represents a monovalent $C_1$–$C_{20}$ hydrocarbon group.

When component (B) is a mixture of a compound represented by formula (1) and a compound represented by formula (2), it is preferred that the weight ratio of the compound of formula (1) to the compound of formula (2) (i.e., formula (1)/formula (2) weight ratio) is in the range of from 1/99 to 99/1, more advantageously from 50/50 to 99/1.

Preferred examples of aliphatic hydrocarbon groups which may be contained in component (B) include a methyl group, an ethyl group and a butyl group. More preferred is a methyl group.

It is preferred that the aromatic group contained in component (B) is a phenyl group.

Component (B) is at least one aromatic group-containing silicone compound selected from the group consisting of an aromatic group-containing silicone compound having a linear configuration and an aromatic group-containing silicone compound having a cyclic configuration. Component (B) is comprised of D units described in the "Silicone Handbook", edited by Kunio Ito and published by The Nikkan Kogyo Shimbun Ltd., Japan, (1990), wherein D unit is a bifunctional unit represented by the following formula (4):

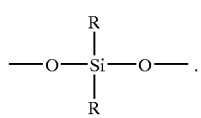

(4)

The silicone compound used in the present invention as component (B) does not contain a unit forming a branched structure or a crosslinked structure. If component (B) contains a silicone compound having a branched structure or a crosslinked structure, component (B) cannot impart a satisfactorily improved flame retardancy to resin component (A). As an example of units forming a branched structure or a crosslinked structure, there can be mentioned T unit described in the above-mentioned "Silicone Handbook", wherein T unit is a trifunctional unit represented by the following formula (5):

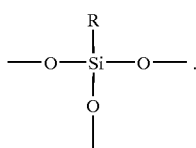

(5)

The amount of component (B) in the resin composition of the present invention is from 0.1 to 100 parts by weight, preferably from 0.1 to 10 parts by weight, more preferably from 1 to 5 parts by weight, relative to 100 parts by weight of resin component (A).

It is required that component (B) contain the aromatic group in an amount of from 5 to 100 mole %, based on the total molar amount of $R^1$, $R^2$, $R^3$ and $R^4$. It is preferred that component (B) contains the aromatic group in an amount of from 10 to 90 mole %, more advantageously from 20 to 90 mole %, most advantageously from 30 to 90 mole %, based on the total molar amount of $R^1$, $R^2$, $R^3$ and $R^4$.

It is preferred that n in the formula (1) above is 10 or more, more advantageously 100 or more.

The aromatic group-containing silicone compound used as component (B) preferably exhibits a kinematic viscosity of 100 centistokes or more, more preferably 300 centistokes or more, most preferably 1,000 centistokes or more, as measured at 25° C. in accordance with JIS-K2410. When the kinematic viscosity of component (B) is less than 100 centistokes, it is possible that component (B) becomes volatile. With respect to the upper limit of the kinematic viscosity of component (B), there is no particular limitation. The kinematic viscosity of component (B) may exceed the measurable highest value (1,000,000 centistokes), and hence component (B) may become gummy.

Component (B) may comprise a mixture of a plurality of silicone compounds each satisfying the requirements of the present invention. When component (B) comprises a mixture of a plurality of silicone compounds, it is preferred that component (B) comprises a mixture of a silicone compound containing the aromatic group in an amount of from 5 to less than 50 mole %, based on the total molar amount of $R^1$, $R^2$, $R^3$ and $R^4$, and a silicone compound containing the aromatic group in an amount of 50 mole % or more, based on the total molar amount of $R^1$, $R^2$, $R^3$ and $R^4$. As component (B), a silicone compound containing the aromatic group in an amount of 50 mole % or more, based on the total molar amount of $R^1$, $R^2$, $R^3$ and $R^4$ is very advantageous for achieving the excellent effects of the present invention; however, this silicone compound is relatively expensive. Therefore, from the economic viewpoint, component (B) preferably comprises a mixture of the above-mentioned silicone compound containing the aromatic group in an amount of from 5 to less than 50 mole % and the above-mentioned silicone compound containing the aromatic group in an amount of 50 mole % or more.

The resin composition of the present invention may further comprise 0.001 to 100 parts by weight of a flame retardant (C).

As flame retardant (C), there can be used at least one flame retardant selected from the group consisting of a silicon-containing flame retardant other than the silicone compound (B), a metal salt flame retardant, a halogen-containing flame retardant, a phosphorus-containing flame retardant, a nitrogen-containing flame retardant, an inorganic flame retardant, a fibrous flame retardant and a char-forming agent. Among these flame retardants, especially preferred are a silicon-containing flame retardant other than the silicone compound (B), a metal salt flame retardant, a phosphorus-containing flame retardant, a nitrogen-containing flame retardant and an inorganic flame retardant.

As the above-mentioned silicon-containing flame retardant other than the silicone compound (B), there can be used, for example, polyorganosiloxanes (e.g., silicones and organosilicates) other than the silicone compound (B), and silica.

Polyorganosiloxanes are classified into an oil, a resin and a rubber, according to the state thereof. A polyorganosiloxane which can be used as silicon-containing flame retardant (C) (other than the silicone compound (B)) in the present invention is a polyorganosiloxane which contains at least one type of unit selected from the group consisting of the types of units described in the above-mentioned "Silicone Handbook", i.e., at least one type of unit selected from the group consisting of M unit which is monofunctional and represented by the formula: $R_3SiO_{1/2}$; the above-mentioned D unit which is bifunctional; the above-mentioned T unit which is trifunctional, Q unit which is tetrafunctional and represented by the formula: $SiO_2$; X unit which contains an alkoxy group or an aryloxy group and is represented by the formula: $R(RO)SiO_{2.0}$; and Y unit which is represented by the formula: $(RO)_2SiO_{3.0}$ (wherein R represents a hydrocarbon group having 1 to 20 carbon atoms), provided that, when the polyorganosiloxane contains only D units, the polyorganosiloxane has an aromatic group content of less than 5 mole %, based on the total molar amount of all R groups. Such a polyorganosiloxane which can be used as silicon-containing flame retardant (C) is an oily polyorganosiloxane having a branched structure or a silicone resin having a three-dimensional network structure. A rubbery polyorganosiloxane is obtained by, for example, vulcanizing a gum-like linear polydiorganosiloxane having a high molecular weight.

As flame retardant (C), there can also be used modification product of the above-mentioned polyorganosiloxanes, and composite materials obtained by combining the above-mentioned polyorganosiloxanes with other substances. Examples of modification products include products obtained by modifying the above-mentioned polyorganosiloxanes with modifying groups, such as an epoxy group, an amino group, a mercapto group and a methacryl group. Examples of composite materials include a polycarbonate-silicone copolymer and an acrylic rubber-silicone composite.

The or each R group in the above-mentioned polyorganosiloxanes usable as flame retardant (C) is a hydrocarbon group having 1 to 20 carbon atoms. Preferred examples of such hydrocarbon groups include a methyl group, an ethyl group, a butyl group, a phenyl group and a benzyl group. More preferred are a methyl group and a phenyl group. In the case of a polyorganosiloxane containing a tri- or more-functional unit, it is preferred that the polyorganosiloxane contains a phenyl group in an amount of 5 to 100 mole %, based on the total molar amount of all R groups. Such polyorganosiloxane as flame retardant (C) is advantageous not only in that it has an excellent compatibility with an aromatic polymer resin, such as PC, but also in that it improves the water resistance and heat resistance of the resin composition.

Silica, which is usable as the above-mentioned silicon-containing flame retardant other than the silicone compound (B), is amorphous silicon dioxide. Especially, silica coated with a hydrocarbon compound (which is obtained by treating the surface of silica with a silane coupling agent composed of a silane and a hydrocarbon compound linked thereto) is preferred. Silica coated with a vinyl group-containing hydrocarbon compound is more preferred:

Examples of silane coupling agents include vinyl group-containing silanes, such as p-styryltrimethoxysilane, vinyltrichlorosilane, vinyltris(β-methoxy-ethoxy)silane, vinyltriethoxysilane, vinyltrimethoxysilane and (γ-methacryloxypropyltrimethoxysilane; epoxysilanes, such as β-(3,4-epoxycyclohexyl)ethyltrimethoxysilane, γ-glycidoxypropyltrimethoxysilane and γ-glycidoxypropyltriethoxysilane; and aminosilanes, such as N-β-(aminoethyl)-γ-aminopropyltrimethoxysilane, N-β-(aminoethyl)-γ-aminopropylmethyldimethoxysilane, γ-aminopropyltriethoxysilane and N-phenyl-γ-aminopropyltrimethoxysilane. Of these, preferred are silane coupling agents having a structural unit which is similar to that of a thermoplastic resin employed. For example, when a styrene polymer is used as a thermoplastic resin, p-styryltrimethoxysilane is suitable.

The methods for treating silica with a silane coupling agent can be roughly classified into a wet method and a dry method. In the wet method, silica is immersed in a solution of a silane coupling agent, followed by drying. In the dry method, silica is charged in an apparatus capable of agitating at a high speed (e.g., Henschel mixer), and a solution of a silane coupling agent is gradually dropped in the charged silica under agitation, followed by heat-treatment.

It is preferred that the metal salt flame retardant as flame retardant (C) is a metal salt of an organic sulfur compound. Examples of organic sulfur compounds include metal salts of organic sulfonic acids, such as potassium trichlorobenzenesulfonate, potassium perfluorobutanesulfonate, potassium diphenylsulfone-3-sulfonate and the like.

Further examples of metal salt flame retardants include metal salts of aromatic sulfonimides; and metal salt-containing aromatic organic polymers having a structure in which a metal salt of sulfonic acid, sulfuric acid, phosphoric acid or boric acid is bonded to the aromatic ring of an aromatic organic polymer, such as an aromatic vinyl polymer, a polyphenylene ether or the like. As the metals of these metal salts, alkali metals or alkaline earth metals can be used.

When a shaped article obtained by molding the resin composition containing the metal salt flame retardant (C) begins to burn, the metal salt flame retardant accelerates a decarboxylation reaction, thereby improving the flame retardancy.

Among the above-mentioned metal salt-containing aromatic organic polymers, especially preferred is an aromatic organic polymer containing a sulfonic acid metal salt. When a shaped article obtained by molding the resin composition containing, as flame retardant (C), an aromatic organic polymer containing a sulfonic acid metal salt begins to burn, the sulfonic acid metal salt functions as a crosslinking reaction site, thereby greatly contributing to the formation of a carbonization product film.

Examples of halogen-containing flame retardants as flame retardant (C) include a bisphenol halide, an aromatic halide, a polycarbonate halide, an aromatic vinyl polymer halide, a cyanurate halide-containing resin and a polyphenylene ether halide. Of these, preferred are decabromodiphenyloxide, tetrabromobisphenol A, an oligomer of tetrabromobisphenol A, a bisphenol bromide-containing phenoxy resin, a bisphenol bromide-containing polycarbonate, polystyrene bromide, crosslinked polystyrene bromide, polyphenylene oxide bromide, polydibromophenylene oxide, a condensation product of decabromodiphenyloxide and a bisphenol, a halogen-containing phosphate, a fluororesin and the like.

Examples of phosphorus-containing flame retardants include an organic phosphorus compound, red phosphorus, an inorganic phosphate and the like.

Examples of organic phosphorus compounds include a phosphine, a phosphine oxide, a bisphosphine, a phosphonium salt, a phosphinic acid salt, a phosphoric ester and a phosphorous ester. More specific examples of organic phosphorus compounds include triphenyl phosphate, methylneopentyl phosphite, pentaerythritol diethyl diphosphite, methyl neopentyl phosphonate, phenyl neopentyl phosphate, pentaerythritol diphenyldiphosphate, dicyclopentyl hypodiphosphate, dineopentyl hypophosphate, phenylpyrocatechol phosphite, ethylpyrocatechol phosphate and dipyrocatechol hypodiphosphate.

With respect to the organic phosphorus compound, it is preferred to use a monomeric aromatic phosphoric ester and an oligomeric aromatic phosphoric ester.

With respect to the above-mentioned monomeric aromatic phosphoric ester, especially preferred is a hydroxyl group-containing monomeric aromatic phosphoric ester described in U.S. Pat. No. 5,278,212, such as those monomeric aromatic phosphoric esters which are obtained by introducing at least one phenolic hydroxyl group into tricresylphosphate or triphenyl phosphate. Also preferred is a monomeric aromatic phosphoric ester containing a long chain alkyl group, described in International Patent Application Publication No. WO 96-27637, such as tris(nonylphenyl)phosphate.

With respect to the above-mentioned oligomeric aromatic phosphoric esters, preferred are bisphenol A bis (diphenylphosphate), bisphenol A bis(dicresylphosphate), resorcinol bis(diphenylphosphate) and the like.

The oligomeric aromatic phosphoric ester produced by a method disclosed in Unexamined Japanese Patent Application Laid-Open Specification No. 5-1079 is also preferred as the above-mentioned organic phosphorus compound. As an example of such a compound usable as a phosphorus-containing flame retardant, there can be mentioned an oligomeric aromatic phosphoric ester obtained by a method in which a 2,6-disubstituted mono-functional phenol is reacted with a phosphorus oxy-halide in the presence of a Lewis acid catalyst to obtain a diarylphosphoro halide and, then, the obtained diarylphosphoro halide is reacted with a bifunctional phenol in the presence of a Lewis acid catalyst.

Examples of red phosphorus used as the phosphorus-containing flame retardant include not only an ordinary red phosphorus but also a red phosphorus product wherein red phosphorus is coated with a film of at least one metal hydroxide selected from the group consisting of aluminum hydroxide, magnesium hydroxide, zinc hydroxide and titanium hydroxide. As another red phosphorus product, there can be mentioned those which are obtained by coating red phosphorus with a film composed of a mixture of a metal hydroxide (selected from the group consisting of aluminum hydroxide, magnesium hydroxide, zinc hydroxide and titanium hydroxide) and a thermosetting resin. As still another red phosphorus product, there can be mentioned those which are obtained by coating red phosphorus with a double-film layer comprising an inner film composed of a metal hydroxide (selected from the group consisting of aluminum hydroxide, magnesium hydroxide, zinc hydroxide and titanium hydroxide) and an outer film composed of a thermosetting resin.

A representative example of inorganic phosphates used as the phosphorus-containing flame retardant is ammonium polyphosphate.

The above-mentioned nitrogen-containing flame retardant can be selected from the group consisting of triazine compounds, triazole compounds, tetrazole compounds, phosphazene compounds and diazo compounds.

Specific examples of the above-mentioned triazine compounds include melamine, melam, melem, mellon (a product obtained by the ammonia-liberating reaction of melem at 600° C. or higher, in which three molecules of ammonia are liberated from three molecules of melem), melamine cyanurate, melamine phosphate, succinoguanamine, adipoguanamine, methylglutaroguanamine, a melamine resin and a BT resin. Of these, melamine cyanurate is preferred from the viewpoint of less volatilization.

Examples of the above-mentioned triazole compounds include triazole, methyltriazole and phenyltriazole.

With respect to the phosphazene compound as a nitrogen-containing flame retardant, there is no particular limitation as long as the compound has a structure in which a phosphorus atom is bonded to a nitrogen atom through a double bond. For example, the phosphazene compound is selected from the group consisting of a cyclic phosphazene and a linear phosphazene. Among these phosphazene compounds, from the viewpoint of achieving a good compatibility with an aromatic polycarbonate, preferred is a phosphazene compound having an aromatic group. It is also preferred that the phosphazene compound is a linear phosphazene.

Examples of cyclic phosphazenes include propoxyphosphazenes, phenoxyphosphazenes, aminophosphazenes and fluoroalkylphosphazenes. Examples of linear phosphazenes include polyarylphosphazenes, such as poly(diphenylphosphazene); polydiaryloxyphosphazenes, such as poly(diphenoxyphosphazene); poly(diaminophosphazene) and poly(difluoroalkylphosphazene). These phosphazene compounds can be obtained by subjecting the corresponding chlorophosphazene compound to a substitution reaction with an alcohol, a phenol or the like.

Examples of tetrazole compounds as a nitrogen-containing flame retardant include 5-phenyltetrazole, a 5,5'-bistetrazole diammonium salt, a 5,5'-bistetrazole diaminoguanidine salt, a 5,5'-bistetrazole piperazine salt, an azobistetrazole diguanidine salt, an azobistetrazole diaminoguanidine salt and the like.

Examples of the above-mentioned diazo compounds include azodicarbonamide, azobisisobutyronitrile, diazoaminobenzene, barium azodicarboxylate and the like.

Examples of inorganic flame retardants as flame retardant (C) include aluminum hydroxide, magnesium hydroxide, dolomite, hydrotalcite, calcium hydroxide, barium hydroxide, basic magnesium carbonate, zirconium hydroxide, a hydrate of an inorganic metal compound (such as tin oxide hydrate), a metal oxide (such as aluminum oxide, iron oxide, titanium oxide, manganese oxide, magnesium oxide, zirconium oxide, zinc oxide, molybdenum oxide, cobalt oxide, bismuth oxide, chromium oxide, tin oxide, antimony oxide, nickel oxide, copper oxide and tungsten oxide), a metal powder (selected from, for example, powders of aluminum, iron, titanium, manganese, zinc, molybdenum, cobalt, bismuth, chromium, nickel, copper, tungsten, tin and antimony), zinc borate, zinc metaborate, barium metaborate, zinc carbonate, magnesium carbonate, calcium carbonate, barium carbonate and the like. Further examples of inorganic flame retardants include kaolin and talc. These substances can be used individually or in combination. Of these, as an inorganic flame retardant which can not only impart an excellent flame retardancy but is also economically advantageous, there can be mentioned at least one compound selected from the group consisting of magnesium hydroxide, aluminum hydroxide, basic magnesium carbonate and hydrotalcite. With respect to kaolin and talc, which generally have the morphology of a flake, it is preferred that they have an average aspect ratio (average major diameter/average minor diameter) of 15 or more, more advantageously 30 or more.

A fibrous flame retardant as flame retardant (C) is used for preventing the dripping of flaming particles from a molded product when the molded product is on fire. Examples of fibrous flame retardants include an organic fibrous flame retardant (such as a fluororesin) and an inorganic fibrous flame retardant (such as a glass fiber). It is preferred that a fibrous flame retardant has an average aspect ratio (average fiber length/average fiber diameter) of 15 or more, more advantageously 30 or more.

Hereinbelow, explanation is made on the organic fibrous flame retardant (hereinafter referred to simply as "fibrous flame retardant"). For realizing the incorporation of the fibrous flame retardant in the resin composition, there are two methods, namely, a method in which the fibrous flame retardant is produced before the production of the resin composition and then added to and melt-kneaded with components (A) and (B), and a method in which the non-fibrous material for the fibrous flame retardant is added to and melt-kneaded with components (A) and (B), thereby causing the material to have a fibrous form during the melt-kneading. The methods for realizing the incorporation of the fibrous flame retardant in the resin composition are described below, by taking for example an aramid fiber, a polyacrylonitrile fiber and a fluororesin fiber.

With respect to the above-mentioned aramid fiber, it is preferred that the fiber has an average diameter of from 1 to 500 µm and an average fiber length of from 0.1 to 10 mm. The aramid fiber can be produced by a method in which isophthalamide or polyparaphenylene terephthalamide is dissolved in a polar solvent containing an amide, or sulfuric acid, and the resultant solution is subjected to dry spinning or wet spinning.

With respect to the above-mentioned polyacrylonitrile fiber as the fibrous flame retardant, it is preferred that the average diameter is 1 to 500 µm and the average fiber length is 0.1 to 10 mm. With respect to the method for producing a polyacrylonitrile fiber, there can be mentioned a dry spinning method in which an acrylonitrile polymer is dissolved in a solvent (such as dimethylformamide), and the resultant solution is subjected to spinning under the flow of air at 400° C., and a wet spinning method in which an acrylonitrile polymer is dissolved in a solvent (such as nitric acid), and the resultant solution is subjected to spinning in water.

The fluororesin used as the above-mentioned fibrous flame retardant is a resin containing fluorine atoms. Specific examples of fluororesins include polymonofluoroethylene, polydifluoroethylene, polytrifluoroethylene, polytetrafluoroethylene and a tetrafluoroethylene-hexafluoropropylene copolymer. If desired, a fluorine-containing monomer may be copolymerized with a comonomer which is copolymerizable with the fluorine-containing monomer.

With respect to the method for producing a fluororesin, reference can be made to U.S. Pat. Nos. 2,393,697 and 2,534,058. For example, a powdery polytetrafluoroethylene can be obtained by a method comprising polymerizing tetrafluoroethylene in an aqueous medium at a temperature of from 0 to 200° C. under a pressure of from 7 to 70 kg/cm$^2$ using a radical initiator (such as ammonium persulfate or potassium persulfate), and coagulating or precipitating the resultant reaction mixture (in a suspension, a dispersion or an emulsion form).

As examples of methods for causing the above-mentioned fluororesin to have a fibrous morphology, the following three methods can be mentioned. In a first method (two-step process), a fluororesin, a thermoplastic resin, and optionally a dispersant are melt-kneaded together, thereby obtaining a masterbatch, and then the obtained masterbatch is melt-kneaded together with a thermoplastic resin and a flame retardant. In a second method (one-step process), an extruder which has first and second extrusion zones is used, wherein the second extrusion zone has a side feeding inlet. In the second method, a fluororesin, a thermoplastic resin and optionally a dispersant are melt-kneaded together in the first extrusion zone and then, further melt-kneaded in the second extrusion zone at a temperature which is lower than the temperature in the first extrusion zone, while feeding a flame retardant through the side feeding inlet. In a third method (one-step process), all components (including a fluororesin) for the resin composition are simultaneously fed into an extruder through the main feeder thereof and melt-kneaded. From the viewpoint of achieving a high flame retardancy of the final resin composition, preferred is the two-step process in which a masterbatch is produced.

A novolak resin can be used as a char-forming agent as flame retardant (C). The novolak resin is a phenol novolak resin which can be obtained by subjecting a phenol and an aldehyde to a condensation reaction in the presence of an acid catalyst, such as sulfuric acid or hydrochloric acid. The method for producing a novolak resin is described at pages 437 to 455 of "Ko-bunshi Jikkengaku 5, Jushukugo-to-Jufuka (Experimental Polymer Chemistry, Series 5, Poly-condensation and Poly-addition)" (which was published by Kyoritsu Shuppan Co., Ltd., Japan).

Specific examples of phenols used for the production of novolak resins include phenol; o-cresol; m-cresol; p-cresol; 2,5-dimethyl-, 3,5-dimethyl-, 2,3,5-trimethyl-, 3,4,5-trimethyl-, p-t-butyl-, p-n-octyl-, p-stearyl-, p-phenyl-, p-(2-phenylethyl)-, o-isopropyl-, p-isopropyl-, m-isopropyl-, p-methoxy- and p-phenoxyphenols; pyrocatechol; resorcinol; hydroquinone; salicylaldehyde; salicylic acid; p-hydroxybenzoic acid; methyl p-hydroxybenzoate; p-cyano and o-cyanophenols; p-hydroxybenzenesulfonic acid; p-hydroxybenzenesulfonamide; cyclohexyl p-hydroxybenzenesulfonate; (4-hydroxyphenyl) phenylphosphinic acid; methyl (4-hydroxyphenyl) phenylphosphinate, 4-hydroxyphenylphosphonic acid; ethyl 4-hydroxyphenylphosphonate; and diphenyl 4-hydroxyphenylphosphonate.

Specific examples of aldehydes used for the production of novolak resins include formaldehyde, acetaldehyde, n-propanal, n-butanal, isobutyl aldehyde, 3-methyl-n-butanal, benzaldehyde, p-tolylaldehyde and 2-phenylacetoaldehyde.

The amount of flame retardant (C) is preferably from 0.001 to 100 parts by weight, more preferably 1 to 50 parts by weight, more preferably 3 to 20 parts by weight, most preferably 5 to 15 parts by weight, relative to 100 parts by weight of resin component (A).

If desired, the resin composition of the present invention may optionally contain a processing aid (D). As processing aid (D), there can be used at least one mold release agent or fluidity improver selected from the group consisting of an aliphatic hydrocarbon, a higher fatty acid, a higher fatty acid ester, a higher fatty acid amide, a higher aliphatic alcohol, a metallic soap, an organosiloxane wax, a polyolefin wax and a polycaprolactone. The amount of processing aid (D) is preferably from 0.01 to 20 parts by weight, more preferably 0.5 to 10 parts by weight, most preferably 1 to 5 parts by weight, relative to 100 parts by weight of resin component (A).

When the resin composition of the present invention is required to have high light resistance, the resin composition may optionally contain a light resistance improver (E) selected from the group consisting of an ultraviolet light absorber, a hindered amine light stabilizer, an antioxidant, an active species capturing agent, a sunproofing agent, a metal inactivating agent, and a light quenching agent. The amount of light resistance improver (E) is preferably from 0.05 to 20 parts by weight, more preferably 0.1 to 10 parts by weight, most preferably 1 to 5 parts by weight, relative to 100 parts by weight of resin component (A).

As examples of methods for producing the resin composition of the present invention, there can be mentioned:

a method in which resin component (A) is mixed with component (B), and the resultant mixture is melt-kneaded by means of an extruder;

a method in which resin component (A) is melted in an extruder, and component (B) is added to the melted resin component (A) in the extruder, and the resultant mixture is melt-kneaded by means of the extruder; and a method in which a masterbatch is produced by melt-kneading the entire of resin component (A) and a part of component (B) or melt-kneading a part of resin component (A) and the entire of component (B), and then the remainder of resin component (A) or component (B), and optionally a flame retardant other than component (B) are added to the masterbatch, followed by melt-kneading.

With respect to the extruder used for the melt extrusion, it is preferred to use a twin-screw extruder. With respect to the twin-screw extruder, it is preferred that the L/D (ratio of the length L of each screw to the inner diameter D of a cylinder portion of the extruder) value is from 20 to 50. Further, it is preferred that the twin-screw extruder has at least two inlets including a main feeding inlet and a side feeding inlet, and has kneading zones positioned at a region between the two or more feeding inlets and at a region extending from one end portion of the extruder to the feeding inlet provided at a position adjacent to the one end portion of the extruder, wherein each of the kneading zones independently has a length corresponding to 3D to 10D.

A preferred form of the resin composition of the present invention is a resin composition comprising:

100 parts by weight of resin component (A) comprised of an aromatic polycarbonate or a resin mixture of an aromatic polycarbonate and an aromatic vinyl polymer resin, 0.1 to 100 parts by weight of component (B) comprised prised of a methylphenylsilicone which satisfies the above-mentioned requirements defined in the present invention, 0.001 to 10 parts by weight of flame retardant (C) comprised of an organic sulfonic acid metal salt (such as potassium diphenylsulfone-3-sulfonate) and/or a phosphazene compound; and 0.001 to 10 parts by weight of a polytetrafluoroethylene.

This resin composition has an excellent balance of various properties, such as flame retardancy, suitability for continuous molding, moldability (melt fluidity), impact resistance, and heat resistance.

The resin composition of the present invention can be obtained by, for example, melt-kneading the above-mentioned components, using a commercially available single-screw or twin-screw extruder. In the production of the resin composition, additives other than the above-mentioned components may be added. Examples of additives include thermal stabilizers; lubricants; fillers; reinforcement agents, such as glass fibers; and colorants, such as dyes and pigments.

The resin composition of the present invention obtained as described above can be subjected to a continuous molding for a long period of time by means of, for example, an injection molding machine or an extrusion molding machine. The resultant molded product has excellent flame retardancy, excellent heat resistance and excellent impact strength.

BEST MODE FOR CARRYING OUT THE INVENTION

The present invention will be further described in more detail with reference to the following Examples and Comparative Examples, which should not be construed as limiting the scope of the present invention.

In the following Examples and Comparative Examples, various properties were measured and evaluated as follows:

(1) Flame retardancy:

The self-extinguishing properties of a ⅛ inch-thick specimen were evaluated in accordance with the VB (Vertical Burning) Method which is described in UL-94. The criteria for the evaluation of the self-extinguishing properties were as follows.

⊚ self-extinguished within less than 20 seconds,

○ self-extinguished within 20 to 40 seconds, and

× totally burnt.

(2) Izod impact strength:

The Izod impact strength of a ¼ inch-thick, V-notched specimen was measured at 23° C. in accordance with ASTM-D256 (unit: kg.cm/cm).

(3) Dependency of Izod impact strength on the thickness:

The Izod impact strengths of a ⅛ inch-thick specimen and a ¼ inch-thick specimen were measured in the same manner as described in item (2) above. The ratio of the Izod impact strength of the ¼ inch-thick specimen to the Izod impact strength of the ⅛ inch-thick specimen was calculated and used as an index of the dependency of Izod impact strength on the thickness. The closer to 1 the ratio, the lower the dependency on the thickness and the more stable the impact strength.

(4) Melt-molding stability (substantially no variation or only small variation in the quality of shaped articles obtained by melt-molding):

Melt-extrusion of a resin composition was conducted for 10 hours using a melt-extruder, during which a shaped article was sampled 10 times every 1 hour. The Izod impact strength values of the obtained 10 shaped articles were measured, and the average Izod impact strength was obtained, and also the difference between the highest and lowest Izod impact strength values was obtained. Then, the percent of the difference between the highest and lowest Izod impact strength values, based on the average Izod impact strength is obtained (this percent is hereinafter referred to simply as the "Izod variation percent"). By using this "Izod variation percent", the melt-molding stability was evaluated (wherein the melt-molding stability is the smallness of variation in the quality of shaped articles obtained by melt-molding and is an index of the suitability for continuous molding).

(5) Melt flow rate (MFR):

The melt flow rate was measured in accordance with ASTM-D1238, and used as a criterion of melt fluidity. That is, the melt flow rate was determined from the extrusion rate (g/10 min) of a resin composition as measured at a melting temperature of 260° C. under a load of 10 kg.

(6) SP value (δ) (solubility parameter) and an average SP value:

The SP value was calculated in accordance with the following Fedors Formula, which is described in Polymer Engineering and Science, 14, (2), 147 (1974), using the data of Δe1 and Δv1 of functional groups of polymers, which data are also described therein:

$$\delta = [\Sigma(\Delta e1)/\Sigma(\Delta v1)]^{1/2}$$

wherein Δe1 represents the cohesive energy per unit functional group, and Δv1 represents the molecular volume per unit functional group, and the unit for δ is $(cal/cm^3)^{1/2}$.

The average SP value of a copolymer or a blend of copolymers was calculated from the SP values of the different constituent monomer units of the copolymer or the SP values of the different constituent copolymers of the copolymer blend by the proportional allocation of the respective SP values of the different constituent monomer units or the different constituent copolymers in accordance with the respective weight ratios of the constituent monomer units or the constituent copolymers, on the assumption that the additivity rule can be applied.

(7) Appearance of the surface:

The yellowness index ΔYI of a resin composition was measured in accordance with JIS-Z8722 (the smaller the ΔYI value, the smaller the yellowness index and the more excellent the appearance of the surface).

(8) Light resistance:

The light resistance was evaluated using ATLAS CI35W Weatherometer (manufactured and sold by ATLAS Electric Devices Co., U.S.A.) as a light resistance testing device, in accordance with JIS-K7102. Exposure conditions were as follows: an internal temperature of testing device of 55° C., a humidity of 55%, no rain, and exposure to a xenon light (wavelength: 340 nm, energy: 0.30 W/m$^2$) for 300 hours. The color difference ΔE between a pre-exposed shaped article and a post-exposed shaped article was measured, using an SM color computer model SM-3 (manufactured and sold by Suga Test Instruments Co., Ltd, Japan) in accordance with the L.a.b. method, to evaluate the color tone difference. The smaller the color tone difference, the higher the light resistance.

(9) Heat stability:

A resin composition was 5 times subjected to pelletizing operation in which the resin composition is melt-extruded and pelletized at 280° C. by means of a melt-extruder. Samples of the resin composition were respectively taken from the 1st-time pelletized composition and the 5th-time pelletized composition. The samples were individually measured with respect to Izod impact strength in the same manner as described in item (2) above. The percent of the Izod impact strength of the 5th-time pelletized composition, based on the Izod impact strength of the 1th-time pelletized composition was obtained (this percent is hereinafter referred to as the "Izod retention percent"). The "Izod retention percent" was used as an index of heat stability.

(10) Flexural modulus:

The flexural modulus was measured at 23° C. in accordance with JIS-K6758 (unit: kg/cm$^2$).

(11) Kinematic viscosity:

The kinematic viscosity was measured at 25° C. in accordance with JIS-K2410 (unit: centistokes).

The components used in Examples and Comparative Examples are as follows.

(a) Silicon-containing flame retardants as aromatic group-containing silicone compound (B) and flame retardant (C):

Silicon-containing compounds shown in Tables 1 to 10 (containing the above-mentioned D and/or T unit) were produced in substantially the same manner as described in Chapter 17 "Shirikoon seizou-hou (Method for producing a silicone)" of the "Silicone Handbook", edited by Kunio Ito and published by The Nikkan Kogyo Shimbun Ltd., Japan, (1990).

It should be noted that some comparative components used in Comparative Examples in place of component (B) do not satisfy the requirements for component (B) of the aromatic polycarbonate resin composition of the present invention; however, these comparative components are also classified into component (B) for the sake of convenience.

(b) Polymers (1) Aromatic polycarbonate (PC):

A commercially available bisphenol A type polycarbonate [trade name: Calibre 13, manufactured and sold by Sumitomo Dow Limited, Japan (hereinafter referred to as "PC")] was used.

(2) Rubber-modified styrene polymer (HIPS):

A commercially available rubber-modified styrene polymer (butadiene/styrene weight ratio=10/90) (trade name: Styron, manufactured and sold by Asahi Chemical Industry Co., Ltd., Japan) (hereinafter referred to as "HIPS") was used.

(3) ABS resin (ABS):

A commercially available ABS resin (acrylonitrile/butadiene/styrene weight ratio=24/20/56) (trade name: Stylac ABS, manufactured and sold by Asahi Chemical Industry Co., Ltd., Japan) (hereinafter referred to as "ABS") was used.

(4) Styrene-ethylene-butylene-styrene copolymer (SEBS):

A commercially available styrene-ethylene-butylene-styrene copolymer {trade name: Tuftec, manufactured and sold by Asahi Chemical Industry Co., Ltd., Japan} (hereinafter referred to as "SEBS") was used.

(5) Maleic anhydride-modified styrene-ethylene-butylene-styrene copolymer (m-SEBS):

A commercially available maleic anhydride-modified styrene-ethylene-butylene-styrene copolymer (trade name: Tuftec, manufactured and sold by Asahi Chemical Industry Co., Ltd., Japan) (hereinafter referred to as "m-SEBS") was used.

(6) Styrene-butadiene copolymer (SB):

A commercially available styrene-butadiene copolymer (trade name: Tufprene, manufactured and sold by Asahi Chemical Industry Co., Ltd., Japan) (hereinafter referred to as "SB") was used.

(7) Epoxidated styrene-butadiene copolymer (ESB):

A commercially available epoxidated styrene-butadiene copolymer (trade name: Epofriend, manufactured and sold by Daicel Chemical Industry Co., Ltd., Japan) (hereinafter referred to as "ESB") was used.

(8) Syndiotactic styrene polymer (SPS):

A syndiotactic polystyrene having a weight average molecular weight of 320,000 and a melting temperature of 270° C. (hereinafter referred to as "SPS") was used.

(9) Polyphenylene ether (PPE):

A commercially available polyphenylene ether (trade name: Xyron, manufactured and sold by Asahi Chemical Industry Co., Ltd., Japan) (hereinafter referred to as "PPE") was used.

(10) Polypropylene (PP):

A commercially available polypropylene (manufactured and sold by Japan Polychem Corporation, Japan) (hereinafter referred to as "PP") was used.

(11) Ethylene-octene copolymer (EO):

A commercially available ethylene-octene copolymer (trade name: Engage, manufactured and sold by Dupont-Dow Elastomers Company, U.S.A.) (hereinafter referred to as "EO") was used.

(12) Acrylonitrile-styrene copolymer (AS):

A) An acrylonitrile-styrene copolymer having copolymerization distribution (AS-1)

The styrene copolymer produced by the following method was used as a compatibility agent.

A mixture of 3.4 parts by weight of acrylonitrile, 81.6 parts by weight of styrene, 15 parts by weight of ethylbenzene and, as a polymerization initiator, 0.03 part by weight of 1,1-bis(t-butylperoxy)-3,3,5-tri-methylcyclohexane was continuously fed to a plug flow type reactor, having three regions connected in series and each equipped with an agitator, at a rate of 0.7 liter/hr. Polymerization was performed at 126° C. and 100 rpm in the first region; at 135° C. and 20 rpm in the second region; and at 147° C. and 10 rpm in the third region. Subsequently, the resultant polymerization reaction mixture was transferred to a degassing apparatus having a temperature of 230° C. to remove unreacted monomers and the solvent. Thus, a random copolymer (hereinafter referred to as "AS-1") was obtained. The obtained copolymer was subjected to analysis (according to a method described in International Patent Application Publication No. WO 95-35346). It was found that the copolymer contained 6% by weight of an acrylonitrile monomer unit and 94% by weight of a styrene monomer unit (as measured by infrared absorption spectrophotometry), and had an average SP value of 10.75. Further, the distribution of the proportions of the component monomers of the copolymer was measured by liquid chromatography. It was found that the proportion of the acrylonitrile monomer units was varied in the range of from 0 to 12% by weight in the copolymer, and the maximum SP value was 11.0, the minimum SP value was 10.5, and the $\Delta$SP value was 0.5.

B) An acrylonitrile-styrene copolymer having a relatively uniform copolymerization distribution (AS-2)

The copolymer produced by the following method was used as a compatibility agent.

Substantially the same procedure as in the production of copolymer AS-1 above was repeated, except that a complete mixing type reactor was used as a polymerization reactor. The obtained copolymer was analyzed. It was found that the copolymer contained 6% by weight of an acrylonitrile monomer unit and 94% by weight of a styrene monomer unit (as measured by infrared absorption spectrophotometry). Further, the distribution of the proportions of the component monomers of the copolymer was measured by liquid chromatography. It was found that the copolymer had a maximum SP value of 11.0, a minimum SP value of 10.8, and a $\Delta$SP value of 0.2.

(13) EO-PP-crosslinked product (TPV):

100 parts by weight of a mixture of EO and PP (weight ratio: 50/50), 0.5 part by weight of an organic peroxide and 1 part by weight of divinylbenzene were melt-kneaded and extruded by means of a twin-screw extruder, to thereby obtain a dynamically crosslinked thermoplastic polypropylene (hereinafter referred to as "TPV").

(14) Polybutylene terephthalate (PBT):

A commercially available polybutylene terephthalate {manufactured and sold by Toray Industries, Japan} (hereinafter referred to as "PBT") was used.

(15) Epoxy polymer (EP):

A commercially available non-halogen-substituted thermoplastic epoxy polymer (manufactured and sold by Asahi-Ciba Co. Ltd., Japan) (hereinafter referred to as "EP") was used.

(16) Polyamide (PA):

A commercially available polyamide resin (trade name: Polyamide 6, manufactured and sold by Toray Industries, Japan) (hereinafter referred to as "PA") was used.

(c) Flame retardant containing no silicon:

(1) Metal salt of organic sulfonic acid

A) A commercially available potassium diphenylsulfone-3-sulfonate (manufactured and sold by UCB Japan Co. Ltd., Japan) (hereinafter referred to as "KSS") was used.

B) A commercially available potassium perfluorobutane-sulfonate (manufactured and sold by Dainippon Ink & Chemicals, Inc., Japan) (hereinafter referred to as "FBK") was used.

(2) 1,3-phenylene-bis(diphenylphosphate) (FP)

A commercially available oligomeric aromatic phosphoric ester derived from resorcinol (trade name: CR733S, manufactured and sold by Daihachi Chemical Industry Co., Ltd., Japan) (hereinafter referred to as "FP") was used.

(3) Polytetrafluoroethylene (PTFE)

A commercially available polytetrafluoroethylene (weight average molecular weight: 1,000,000) (manufactured and sold by Daikin Industries, Ltd., Japan) (hereinafter referred to as "PTFE") was used.

(4) Melamine cyanurate (MC)

A commercially available melamine cyanurate (manufactured and sold by Nissan Chemical Industries, Ltd., Japan) (hereinafter referred to as "MC") was used.

(5) Phosphazene

A) Linear phosphazene

Poly(diphenoxyphosphazene) (melting temperature: (110° C.) (hereinafter referred to as "PPP") was used.

B) cyclic phosphazene (I)

Hexakis(acryloylethoxy)phosphazene (hereinafter referred to as "HAP") was used.

C) Cyclic phosphazene (II)

Cyclic phenoxyphosphazene represented by the formula:

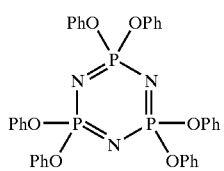

wherein each Ph represents a phenyl group, was used (hereinafter referred to as "CPP").

(6) Tetrazole

A commercially available 5,5'-bistetrazole piperazine salt (manufactured and sold by Toyo Kasel Kogyo Co. Ltd., Japan) (hereinafter referred to as "BPP") was used.

(7) Glass fiber

Glass fibers having varied average aspect ratios (manufactured and sold by Asahi Fiber Glass Co., Ltd., Japan) were used (hereinafter referred to as "GF").

Examples 1 to 9 and Comparative Examples 1 to 11

In accordance with the formulations indicated in Tables 1 and 2, the components were mixed with each other by means of a Henschel mixer. Each of the resultant mixture was individually transferred into a twin-screw extruder (40 mmϕ, L/D=47) having two double-threaded screws, wherein an inlet is provided at the middle portion of the barrel and wherein the entire lengths of the screws correspond to the kneading zone, and a continuous melt-extrusion was conducted at 280° C. for 10 hours, thereby obtaining a resin composition.

The obtained composition was subjected to an injection molding under conditions wherein the cylinder temperature was 270° C. and the mold temperature was 60° C., to thereby obtain shaped articles. The obtained shaped articles were subjected to testings for evaluating the above-mentioned properties. The results are shown in Tables 1 and 2.

From Tables 1 and 2, it is apparent that the aromatic polycarbonate resin composition of the present invention, which contains as component (B) a linear silicone consisting of D units and containing the aromatic group in an amount of 5 mole % or more, is advantageous not only in that it has excellent flame retardancy, excellent melt fluidity and excellent melt-molding stability (i.e., substantially no variation or only small variation in the quality of shaped articles obtained by melt-molding), but also in that it can be used for producing a shaped article having excellent mechanical properties, excellent light stability and excellent appearance, as compared to the properties of an aromatic polycarbonate resin composition containing a branched or crosslinked silicone resin containing T units.

Further, it was also found that, if the aromatic polycarbonate used in the resin composition of the present invention is replaced by a polyphenylene ether, the improvement of flame retardancy and light stability (achieved by the resin composition of the present invention) cannot be achieved.

Examples 10 to 57

The production and evaluation of a resin composition were conducted in substantially the same manner as in Example 1, except that the types and amounts of the components of the resin composition were changed to those indicated in Tables 3 to 6. The results are shown in Tables 3 to 6.

Tables 3 to 6 show that, when flame retardant (C) which is selected from the group consisting of a metal salt flame retardant, a phosphorus-containing flame retardant, a nitrogen-containing flame retardant, a silicon-containing flame retardant other than the silicone compound (B), an inorganic flame retardant and a fluorine-containing flame retardant is added to the resin composition of the present invention, the flame retardancy of the resin composition is further improved.

Tables 3 to 6 also show that, when a rubber polymer is added to PC used in the resin composition of the present invention, the impact strength of the resin composition is greatly improved, and that, when a polyester (such as PBT), a thermoplastic epoxy polymer or a polyamide is added to PC used in the resin composition of the present invention, the melt fluidity of the resin composition is greatly improved.

Examples 58 to 69

The production and evaluation of a resin composition were conducted in substantially the same manner as in Example 1, except that the types and amounts of the components of the resin composition were changed to those indicated in Table 7. The results are shown in Table 7.

Table 7 shows that, even if component (B) of the resin composition of the present invention is a mixture of a silicone compound containing the aromatic group in an amount of from 5 to less than 50 mole % and a silicone compound containing the aromatic group in an amount of 50 mole % or more (wherein the ratio of the two different types of silicone compounds varies), the various excellent effects of the present invention can be achieved, as long as each of the two different types of silicone compounds constituting component (B) satisfies the requirements of the present invention for component (B).

Examples 70 to 77

The production and evaluation of a resin composition were conducted in substantially the same manner as in Example 1, except that the types and amounts of the components of the resin composition were changed to those indicated in Table 8. The results are shown in Table 8.

Table 8 shows that, when at least one of terminal $R^3$ and $R^4$ groups of formula (1) is a silicon-containing monovalent group comprising a silicon atom having bonded thereto at least one hydrocarbon group, the heat stability of the resin composition is greatly improved.

Examples 78 to 91

The production and evaluation of a resin composition were conducted in substantially the same manner as in Example 1, except that the types and amounts of the components of the resin composition were changed to those indicated in Table 9. The results are shown in Table 9.

Table 9 shows that, when flame retardant (C) which is selected from the group consisting of cyclic phenoxyphosphazene (CPP), glass fiber (GF), potassium perfluorobutanesulfonate (FBK) and polytetrafluoroethylene (PTFE) is added to the resin composition of the present invention, the flame retardancy of the resin composition is greatly improved. Table 9 also shows that, when glass fibers having an average aspect ratio of 15 or more are used, the flame retardancy and flexural modulus of the resin composition are further improved.

Examples 92 to 101

The production and evaluation of a resin composition were conducted in substantially the same manner as in Example 1, except that the types and amounts of the components of the resin composition were changed to those indicated in Table 10. The results are shown in Table 10.

Table 10 shows that, when component (B) exhibiting a kinematic viscosity of from 100 to 1,500 centistokes (cSt) is used, the flame retardancy of the resin composition is greatly improved. Table 10 also shows that, when component (B) is comprised of a mixture of a compound represented by formula (1) and a compound represented by formula (2), the Izod impact strength of the resin composition is improved (see Example 101).

The meanings of the abbreviations used in Tables 1 to 10 are as follows.

PC: aromatic polycarbonate;
PPE: polyphenylene ether;
HIPS: rubber-modified styrene polymer;
ABS: ASS resin;
SEBS: styrene-ethylene-butylene-styrene copolymer;
m-SEBS: maleic anhydride-modified styrene-ethylene-butylene-styrene copolymer;
SB: styrene-butadiene copolymer;
ESB: epoxidated styrene-butadiene copolymer;
SPS: syndiotactic styrene polymer;
PP: polypropylene;
EO: ethylene-octene copolymer;
AS-1 and AS-2: acrylonitrile-styrene copolymer;
TPV: EO-PP-crosslinked product;
PBT: polybutylene terephthalate;
EP: epoxy resin;
KSS: potassium diphenylsulfone-3-sulfonate;
FBK: potassium perfluorobutanesulfonate;
FP: 1,3-phenylene-bis(diphenylphosphate);
PTFE: polytetrafluoroethylene;
MC: melamine cyanurate;
PPP; poly(diphenoxyphosphazene);
HAP: hexakis(acryloylethoxy)phosphazene;
CPP: cyclic phenoxyphosphazene;
BPP: 5,5'-bistetrazole piperazine salt; and
GF: glass fibers.

TABLE 1

|  |  | Examples | | Comparative Examples | | | | | |
|---|---|---|---|---|---|---|---|---|---|
|  |  | 1 | 2 | 1 | 2 | 3 | 4 | 5 | 6 |
| Composition (weight ratio) | (A) PC | 92 | 100 | 92 | | 0 | | 0 | |
|  | (B) Amount | 8 | 0 | 8 | | | 0 | 8 | 8 |
|  | D units/T units (molar ratio)[1] | 100/0 | — | 100/0 | 50/50 | — | 100/0 | 50/50 | |
|  | Phenyl groups/Methyl groups (molar ratio) | 25/75 | 5/95 | — | 3/97 | 25/75 | — | 25/75 | 25/75 |
|  | Presence or absence of methoxy groups in which $R^3$ or $R^4$ is a methyl group |  |  |  | None | | | | |
|  | Kinematic viscosity (cSt) |  |  |  | 500 | | | | |
|  | PPE |  |  |  | | | 100 | 92 | |
| Flame retardancy[2] |  | ⊙ | ⊙ | x | x | x | ○ | ○ | ○ |
| Izod impact strength (kg · cm/cm) |  | 15 | 12 | 15 | 7 | 5 | 7 | 5 | 3 |
| Appearance: Yellowness index ΔYI |  | 2 | 2 | 3 | 3 | 3 | 43 | 44 | 45 |
| Light resistance: Difference in color tone ΔE |  | 2 | 2 | 3 | 3 | 5 | 20 | 22 | 25 |
| Extrusion stability: Izod variation percent |  | 5 | 7 | 5 | 29 | 33 | 9 | 18 | 40 |

Notes for Table 1
[1] Structure of D unit:

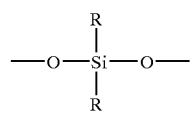

Structure of T unit:

TABLE 1-continued

|  | Examples | | Comparative Examples | | | | | |
|---|---|---|---|---|---|---|---|---|
|  | 1 | 2 | 1 | 2 | 3 | 4 | 5 | 6 |

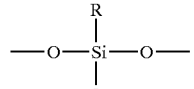

[2]Flame retardancy:
◎ self-extinguished within less than 20 seconds,
○ self-extinguished within 20 to 40 seconds, and
x totally burnt.
Notes [1] and [2] above apply to Tables 2 to 10 below

TABLE 2

|  | Examples | | | | | | | Comparative Examples | | | | |
|---|---|---|---|---|---|---|---|---|---|---|---|---|
|  | 3 | 4 | 5 | 6 | 7 | 8 | 9 | 7 | 8 | 9 | 10 | 11 |
| Composition (weight ratio) | | | | | | | | | | | | |
| (A) PC | | | | | | | 90 | | | | | |
| (B) Amount | | | | | | | 10 | | | | | |
| D units/T units (molar ratio)[1] | | | 100/0 | | | | | 100/0 | 0/100 | 10/90 | 50/50 | 80/20 |
| Phenyl groups/ Methyl groups (molar ratio) | 10/90 | 40/60 | 60/40 | 70/30 | 90/10 | 100/0 | 60/40 | 0/100 | | 60/40 | | |
| Presence or absence of methoxy groups in which $R^3$ or $R^4$ is a methyl group | | | None | | | | Present | | None | | | |
| Kinematic viscosity (cSt) | | | | | | | 500 | | | | | |
| Flame retardancy[2] | ○ | ◎ | ◎ | ◎ | ○ | ○ | ◎ | × | × | × | × | × |
| Izod impact strength (kg · cm/cm) | 10 | 12 | 13 | 14 | 16 | 18 | 12 | 2 | 3 | 4 | 6 | 8 |
| Appearance: Yellowness index ΔYI | 2 | 2 | 2 | 3 | 3 | 3 | 2 | 2 | 3 | 3 | 3 | 5 |
| Light resistance: Difference in color tone ΔE | 2 | 2 | 2 | 3 | 3 | 3 | 2 | 2 | 4 | 4 | 5 | 6 |
| Extrusion stability: Izod variation percent | 7 | 5 | 5 | 5 | 4 | 4 | 4 | 55 | 63 | 43 | 35 | 31 |

TABLE 3

|  | Examples | | | | | | |
|---|---|---|---|---|---|---|---|
|  | 10 | 11 | 12 | 13 | 14 | 15 | 16 |
| Composition (weight ratio) | | | | | | | |
| (A) Amount | | | | 95 | | | |
|  | PC | PC | PC/ABS 90/10 | PC/ABS 90/10 | PC/ABS 90/10 | PC/HIPS 90/10 | PC/HIPS 90/10 |
| (B) Amount | | | | 5 | | | |
| D units/T units (molar ratio)[1] | | | | 100/0 | | | |
| Phenyl groups/ Methyl groups (molar ratio) | | | | 50/50 | | | |
| Presence or absence of methoxy groups in which $R^3$ or $R^4$ is a methyl group | | | | None | | | |
| Kinematic viscosity (cSt) | | | | 500 | | | |
| (C) | 0 | 1 (KSS) | 0 | 1 (KSS) | 5 (FP) | 0 | 1 (KSS) |
| Flame retardancy[2] | ○ | ◎ | ○ | ◎ | ◎ | ○ | ◎ |
| Izod impact strength (kg · cm/cm) | 15 | 14 | 41 | 40 | 38 | 9 | 8 |

TABLE 3-continued

|  |  |  |  |  |  |  |  |
|---|---|---|---|---|---|---|---|
| Appearance: Yellowness index ΔYI | 2 | 2 | 2 | 3 | 3 | 3 | 2 |
| Light resistance: Difference in color tone ΔE | 2 | 2 | 2 | 3 | 3 | 3 | 2 |
| Extrusion stability: Izod variation percent | 6 | 5 | 5 | 6 | 4 | 6 | 7 |

|  | Examples | | | | |
|---|---|---|---|---|---|
|  | 17 | 18 | 19 | 20 | 21 |
| (A) Amount | 95 | | | | 98 |
|  | PC/HIPS/ AS-1 = 90/5/5 | PC/HIPS/ AS-2 = 90/5/5 | PC/HIPS/ PPE = 90/5/5 | PC/HIPS/ PPE/ AS-1 = 90/4/3/3 | PC/HIPS/ PPE/ AS-1 = 90/4/3/3 |
| (B) Amount | | 5 | | | 2 |
| D units/T units (molar ratio)[1] | | | 100/0 | | |
| Phenyl groups/ Methyl groups (molar ratio) | | | 50/50 | | |
| Presence or absence of methoxy groups in which $R^3$ or $R^4$ is a methyl group | | | None | | |
| Kinematic viscosity (cSt) | | | 500 | | |
| (C) | 1 (KSS) | 1 (KSS) | 0 | 0 | 0 |
| Flame retardancy[2] | ⊚ | ⊚ | ⊚ | ⊚ | ⊚ |
| Izod impact strength (kg · cm/cm) | 42 | 10 | 8 | 38 | 42 |
| Appearance: Yellowness index ΔYI | 2 | 2 | 3 | 3 | 2 |
| Light resistance: Difference in color tone ΔE | 2 | 2 | 4 | 4 | 3 |
| Extrusion stability: Izod variation percent | 4 | 5 | 4 | 5 | 4 |

TABLE 4

|  | Examples | | | | | | | | | | | |
|---|---|---|---|---|---|---|---|---|---|---|---|---|
|  | 22 | 23 | 24 | 25 | 26 | 27 | 28 | 29 | 30 | 31 | 32 | 33 |
| Composition (weight ratio) | | | | | | | | | | | | |
| (A) Amount | | | | | | | 93 | | | | | |
|  | PC | PC/SEBS 90/10 | PC/ESB 90/10 | PC/TPV 90/10 | PC/TPV/ SEBS = 90/5/5 | PC/TPV/ SEBS/ AS-1 = 90/4/3/3 | PC/SPS 90/10 | PC/SPS/ PPE = 85/10/5 | PC/SPS/ PPE/ AS-1 = 80/10/5/5 | PC/SPS/ PPE/ AS-1/ SEBS = 75/10/ 5/5/5 | PC/TPV 90/10 | |
| (B) Amount | | | | | | | 7 | | | | | |
| D units/T units (molar ratio)[1] | | | | | | | 100/0 | | | | | |
| Phenyl groups/ Methyl groups (molar ratio) | | | | | | | 50/50 | | | | | |
| Presence or absence of methoxy groups in which $R^3$ or $R^4$ is a methyl group | | | | | | | None | | | | | |
| Kinematic viscosity (cSt) | | | | | | | 500 | | | | | |
| (C) | | | | | | | 0 | | | | 0.5 KSS | 0.5/0.5 KSS/PTFE |
| Flame retardancy[2] | ○ | ○ | ○ | ○ | ○ | ○ | ○ | ⊚ | ⊚ | ⊚ | ⊚ | ⊚ |
| Izod impact strength (kg · cm/cm) | 12 | 45 | 41 | 23 | 32 | 46 | 10 | 25 | 35 | 44 | 22 | 26 |
| Appearance: Yellowness index ΔYI | 2 | 2 | 3 | 2 | 2 | 2 | 2 | 3 | 3 | 3 | 2 | 2 |

TABLE 4-continued

| | Examples | | | | | | | | | | | |
|---|---|---|---|---|---|---|---|---|---|---|---|---|
| | 22 | 23 | 24 | 25 | 26 | 27 | 28 | 29 | 30 | 31 | 32 | 33 |
| Light resistance: Difference in color tone ΔE | 2 | 2 | 3 | 2 | 2 | 2 | 2 | 4 | 4 | 4 | 2 | 2 |
| Extrusion stability: Izod variation percent | 6 | 6 | 4 | 7 | 6 | 5 | 6 | 7 | 5 | 3 | 5 | 3 |

TABLE 5

| | Examples | | | | | | | | | |
|---|---|---|---|---|---|---|---|---|---|---|
| | 34 | 35 | 36 | 37 | 38 | 39 | 40 | 41 | 42 | 43 |
| Composition (weight ratio) | | | | | | | | | | |
| (A) Amount | PC | PC/ m-SEBS 95/5 | 98 PC/ m-SEBS/ AS-1 95/4/1 | PC/ m-SEBS 95/5 | PC/ m-SEBS/ AS-1 95/4/1 | PC/ m-SEBS 95/5 | PC/ m-SEBS/ AS-1 95/4/1 | 99 PC/ m-SEBS 95/5 | PC/ m-SEBS/ AS-1 95/4/1 | PC/ m-SEBS/ AS-1 95/4/1 |
| (B) Amount | | | 2 | | | | | 1 | | |
| D units/T units (molar ratio)[1] | | | | | | 100/0 | | | | |
| Phenyl groups/ Methyl groups (molar ratio) | | | | | | 50/50 | | | | |
| Presence or absence of methoxy groups in which $R^3$ or $R^4$ is a methyl group | | | | | | None | | | | |
| Kinematic viscosity (cSt) | | | | | | 500 | | | | |
| (C) | | 0 | | 0.5 FBK | 0.5 FBK | 0.5 FBK | 0.5 PTFE | 0.5 KSS | 0.5 PTFE | 1.0 MC |
| Flame retardancy[2] | ○ | ○ | ○ | ⊙ | ⊙ | ⊙ | ⊙ | ⊙ | ⊙ | ⊙ |
| Dependency of Izod impact strength on thickness* | 3.1 | 1.9 | 1.2 | 2.0 | 1.5 | 1.9 | 1.3 | 1.8 | 1.2 | 1.3 |
| Appearance: Yellowness index ΔYI | 2 | 2 | 2 | 2 | 2 | 2 | 2 | 2 | 2 | 2 |
| Light resistance: Difference in color tone ΔE | 2 | 2 | 2 | 2 | 2 | 2 | 2 | 2 | 2 | 2 |
| Extrusion stability: Izod variation percent | 6 | 4 | 3 | 5 | 4 | 5 | 4 | 6 | 5 | 4 |

*The closer to 1 the ratio of the Izod impact strength of the ¼ inch-thick specimen to the Izod impact strength of the ⅛ inch-thick specimen, the lower the dependency on the thickness and the more stable the impact strength.

TABLE 6

| | Examples | | | | | | | | | | | | | |
|---|---|---|---|---|---|---|---|---|---|---|---|---|---|---|
| | 44 | 45 | 46 | 47 | 48 | 49 | 50 | 51 | 52 | 53 | 54 | 55 | 56 | 57 |
| Composition (weight ratio) | | | | | | | | | | | | | | |
| (A) Amount | | | PC | | | | PC/PBT = 95/5 | 93 | | | PC/EP = 95/5 | | PC/PA = 95/5 | |
| (B) Amount | | | | | | | | 7 | | | | | | |
| D units/T units (molar ratio)[1] | | | | | | | | 100/0 | | | | | | |
| Phenyl groups/ Methyl groups (molar ratio) | | | | | | | | 25/75 | | | | | | |
| Presence or absence of methoxy groups in which $R^3$ or $R^4$ is a methyl group | | | | | | | | None | | | | | | |
| Kinematic viscosity (cSt) | | | | | | | | 500 | | | | | | |

TABLE 6-continued

|  | Examples | | | | | | | | | | | | | |
| --- | --- | --- | --- | --- | --- | --- | --- | --- | --- | --- | --- | --- | --- | --- |
|  | 44 | 45 | 46 | 47 | 48 | 49 | 50 | 51 | 52 | 53 | 54 | 55 | 56 | 57 |
| (C) | — | 0.5 BPP | 0.5 PPP | 0.5 HAP | — | 0.5 KSS | 0.5/0.5 = KSS/PPP | 0.5/0.5/ 0.5 = KSS/PPP/ PTFE | — | 0.5 KSS | 0.5/0.5 = KSS/PPP | 0.5/0.5/ 0.5 = KSS/PPP/ PTFE | — | 0.5 KSS |
| Flame retardancy[2] | ○ | ⊚ | ⊚ | ⊚ | ○ | ⊚ | ⊚ | ⊚ | ○ | ⊚ | ⊚ | ⊚ | ○ | ⊚ |
| Fluidity: Melt flow rate (g/10 min.) | 45 | 43 | 47 | 48 | 80 | 82 | 83 | 82 | 110 | 112 | 115 | 114 | 105 | 110 |
| Appearance: Yellowness index ΔYI | 2 | 2 | 2 | 2 | 2 | 2 | 2 | 2 | 2 | 2 | 2 | 2 | 2 | 2 |
| Light resistance: Difference in color tone ΔE | 2 | 2 | 2 | 2 | 2 | 2 | 2 | 2 | 2 | 2 | 2 | 2 | 2 | 2 |
| Extrusion stability: Izod variation percent | 5 | 3 | 6 | 7 | 8 | 7 | 7 | 9 | 9 | 8 | 8 | 10 | 8 | 7 |

TABLE 7

|  | Examples | | | | | | | | | | | |
| --- | --- | --- | --- | --- | --- | --- | --- | --- | --- | --- | --- | --- |
|  | 58 | 59 | 60 | 61 | 62 | 63 | 64 | 65 | 66 | 67 | 68 | 69 |
| Composition (weight ratio) | | | | | | | | | | | | |
| (A) Amount | | | PC | | | | 90 | | | | PC/TPV 90/10 | PC/ m-SEBS/ AS-1 95/4/1 |
| (B-1) Amount | 10 | 8 | 5 | 2 | 0 | 10 | 8 | 5 | 2 | 0 | 5 | |
| D units/T units (molar ratio)[1] | | | | | | | 100/0 | | | | | |
| Phenyl groups/ methyl groups (molar ratio) | | | | | | | 80/20 | | | | | |
| Presence or absence of methoxy groups in which R³ or R⁴ is a methyl group | | | | | | | None | | | | | |
| (B-2) Amount | 0 | 2 | 5 | 8 | 10 | 0 | 2 | 5 | 8 | 10 | 5 | |
| D units/T units (molar ratio)[1] | | | | | | | 100/0 | | | | | |
| Phenyl groups/ methyl groups (molar ratio) | | | | | | | 10/90 | | | | | |
| Presence or absence of methoxy groups in which R³ or R⁴ is a methyl group | | | | | | | None | | | | | |
| Kinematic viscosity of (B-1) and (B-2) (cSt) | | | | | | | 500 | | | | | |
| (C) | | 0 | | | | | 0.5/0.5 KSS/PTFE | | | | 0.5/0.5 FBK/PTFE | |
| Flame retardancy[2] | ⊚ | ⊚ | ⊚ | ⊚ | ○ | ⊚ | ⊚ | ⊚ | ⊚ | ⊚ | ○ | ○ |
| Izod impact strength (kg · cm/cm) | 13 | 12 | 12 | 12 | 10 | 12 | 11 | 11 | 11 | 9 | 22 | 26 |
| Appearance: Yellowness index ΔYI | 2 | 2 | 2 | 2 | 2 | 2 | 2 | 2 | 2 | 2 | 2 | 2 |
| Light resistance: Difference in color tone ΔE | 2 | 2 | 2 | 2 | 2 | 2 | 2 | 2 | 2 | 2 | 2 | 2 |
| Extrusion stability: Izod variation percent | 4 | 4 | 5 | 5 | 9 | 5 | 6 | 6 | 6 | 10 | 5 | 3 |

TABLE 8

|  |  | Examples | | | | |
| --- | --- | --- | --- | --- | --- | --- |
|  |  | 70 | 71 | 72 | 73 | 74 |
| Composition (weight ratio) | (A) Amount | | | 90 PC | | |
|  | (B) Amount | | | 10 | | |
|  | D units/T units (molar ratio)[1] | | | 100/0 | | |
|  | $R^3$ and $R^4$ (see 3) and 4)) | $R^3$=H $R^4$=H | $R^3$=Si(CH$_3$)$_3$ $R^4$=Si(CH$_3$)$_3$ | $R^3$=Si(CH$_3$)$_3$ $R^4$=H | $R^3$=Si(CH$_3$)$_3$ $R^4$=CH$_3$ | $R^3$=Si(Ph)$_2$CH$_3$ $R^4$=Si(Ph)$_2$CH$_3$ |
|  | n | 1 | 1 | 1 | 1 | 1 |
|  | Kinematic viscosity (cSt) | | | 500 | | |
| Flame retardancy[2] | | ○ | ⊚ | ○ | ○ | ⊚ |
| Izod impact strength (kg · cm/cm) | | 10 | 13 | 15 | 14 | 18 |
| Appearance: Yellowness index ΔYI | | 2 | 2 | 2 | 2 | 3 |
| Light resistance: Difference in color tone ΔE | | 2 | 2 | 2 | 2 | 3 |
| Extrusion stability: Izod variation percent | | 7 | 4 | 5 | 3 | 3 |
| Heat stability: Izod retention percent | | 81 | 91 | 85 | 93 | 95 |

|  |  | Examples | | |
| --- | --- | --- | --- | --- |
|  |  | 75 | 76 | 77 |
| Composition (weight ratio) | (A) Amount | | 90 PC | |
|  | (B) Amount | | 10 | |
|  | D units/T units (molar ratio)[1] | | 100/0 | |
|  | $R^3$ and $R^4$ (see 3) and 4)) | $R^3$=Si(Ph)$_2$CH$_3$ $R^4$=Si(Ph)$_2$CH$_3$ | $R^3$=Si(Ph)(CH$_3$)$_2$ $R^4$=Si(Ph)$_2$CH$_3$ | $R^3$=Si(Ph)$_3$ $R^4$=Si(Ph)$_3$ |
|  | n | 3 | 1 | 1 |
|  | Kinematic viscosity (cSt) | | 500 | |
| Flame retardancy[2] | | ⊚ | ⊚ | ⊚ |
| Izod impact strength (kg · cm/cm) | | 20 | 17 | 18 |
| Appearance: Yellowness index ΔYI | | 4 | 4 | 3 |
| Light resistance: Difference in color tone ΔE | | 3 | 3 | 3 |
| Extrusion stability: Izod variation percent | | 2 | 2 | 2 |
| Heat stability: Izod retention percent | | 97 | 97 | 96 |

Notes for Table 8
3) Structure of component (B):

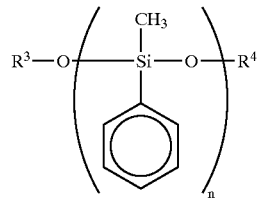

4) Ph means a phenyl group.
Notes 3) and 4) above apply also to Table 9 below.

TABLE 9

|  | Examples | | | | | | | | | | | | | |
| --- | --- | --- | --- | --- | --- | --- | --- | --- | --- | --- | --- | --- | --- | --- |
|  | 78 | 79 | 80 | 81 | 82 | 83 | 84 | 85 | 86 | 87 | 88 | 89 | 90 | 91 |
| Composition (weight ratio) | | | | | | | | | | | | | | |
| (A) PC | 95 | | | | 99 | | | | | 90 | | 92 | | |
| ABS | 0 | | | | 0 | | | | | 5 | | 0 | | |
| m-SEBS | 0 | | | | 0 | | | | | 0 | | 3 | | |
| (B) Amount | 5 | | | | 1 | | | | | 5 | | | | |
| D units/T units (molar ratio)[1] | | | | | | | 100/0 | | | | | | | |
| $R^3$ and $R^4$ (see 3) and 4)) | | | | | | | $R^3$ = Si(Ph)$_2$CH$_3$ $R^4$ = Si(Ph)$_2$CH$_3$ | | | | | | | |
| n | | | | | | | 1 | | | | | | | |
| Kinematic viscosity (cSt) | | | | | | | 500 | | | | | | | |
| (C) CPP (amount) | 0 | 1 | 0 | | | | 0 | | | 2 | 0 | 0 | 2 | 0 |
| GF amount | | 0 | | | 15 | | | | 0 | 0 | 15 | 0 | 0 | 15 |
| average aspect ratio | | 0 | | 5 | 10 | 15 | 30 | | 0 | 0 | 15 | 0 | 0 | 15 |

TABLE 9-continued

|  | Examples | | | | | | | | | | | | | |
| --- | --- | --- | --- | --- | --- | --- | --- | --- | --- | --- | --- | --- | --- | --- |
|  | 78 | 79 | 80 | 81 | 82 | 83 | 84 | 85 | 86 | 87 | 88 | 89 | 90 | 91 |
| FBK (amount) | 0 |  | 0.3 |  | 0.1 |  |  |  | 0 | 0 | 0.1 | 0 | 0 | 0.1 |
| PTFE (amount) | 0 |  | 0.3 |  | 0 |  |  |  | 0 | 0 | 0 | 0 | 0 | 0 |
| Flame retardancy[2] | ○ | ⊙ | ⊙ | ○ | ○ | ○ | ⊙ | ⊙ | ○ | ⊙ | ⊙ | ○ | ⊙ | ⊙ |
| Flexural modulus (kg/cm$^2$) | 25,000 | 24,500 | 25,000 | 24,500 | 29,000 | 35,000 | 45,000 | 65,000 | 26,000 | 25,500 | 48,000 | 23,000 | 24,000 | 46,000 |
| Extrusion stability: Izod variation percent | 6 | 5 | 4 | 6 | 4 | 5 | 3 | 4 | 7 | 6 | 5 | 7 | 5 | 6 |

TABLE 10

|  |  | Examples | | | | | | | | | |
| --- | --- | --- | --- | --- | --- | --- | --- | --- | --- | --- | --- |
|  |  | 92 | 93 | 94 | 95 | 96 | 97 | 98 | 99 | 100 | 101 |
| (A) | Amount |  |  |  |  | 90 PC |  |  |  |  |  |
| (B-1)* | Amount |  |  |  | 10 |  |  |  | 0 |  | 5 |
|  | D units/T units (molar ratio)[1] |  |  |  | 100/0 |  |  |  | — |  | 100/0 |
|  | Kinematic viscosity (cSt) | 50 | 100 | 500 | 1,500 | 10,000 | 100,000 | — | — | — | 500 |
| (B-2)** | Amount |  |  |  | 0 |  |  |  | 10 |  | 5 |
|  | D units/T units (molar ratio)[1] |  |  |  | 0 |  |  |  | 100/0 |  |  |
|  | Kinematic viscosity (cSt) | — | — | — | — | — | — | 50 | 100 | 500 |  |
| Flame retardancy[2] |  | ○ | ⊙ | ⊙ | ⊙ | ○ | ○ | ○ | ⊙ | ⊙ | ⊙ |
| Izod impact strength (kg · cm/cm) |  | 10 | 13 | 15 | 17 | 16 | 15 | 9 | 12 | 14 | 19 |
| Appearance: Yellowness index ΔYI |  | 2 | 2 | 2 | 3 | 3 | 2 | 3 | 2 | 3 | 2 |
| Light resistance: Difference in color tone ΔE |  | 2 | 3 | 2 | 3 | 2 | 3 | 2 | 3 | 3 | 1 |
| Extrusion stability: Izod variation percent |  | 7 | 5 | 4 | 5 | 6 | 7 | 8 | 5 | 4 | 2 |
| Heat stability: Izod retention percent |  | 90 | 98 | 95 | 94 | 93 | 95 | 91 | 93 | 95 | 97 |

Note: With respect to "*" and "**", please see the following:
*Structure of component (B-1):

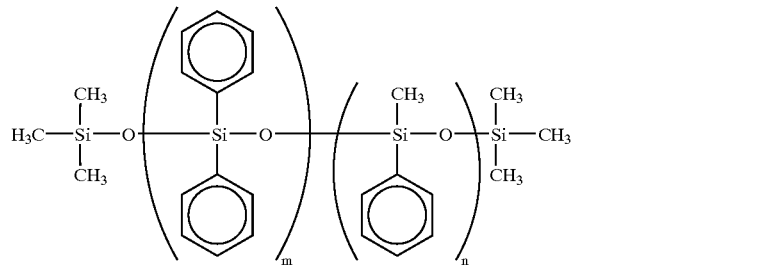

wherein m = n
**Structure of component (B-2):

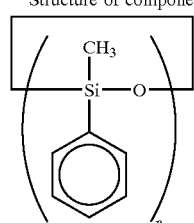

n (=m) of (B-1) and n of (B-2) were varied in the range of from 1 to 1,000 so that the kinematic viscosities indicated in Table 10 were obtained.

INDUSTRIAL APPLICABILITY

The present invention provides an aromatic polycarbonate resin composition which has not only excellent flame retardancy, but also excellent melt fluidity and excellent melt-molding stability (i.e., substantially no variation or only small variation in the quality of shaped articles obtained by melt-molding), and which can be advantageously used for producing shaped articles having excellent mechanical properties, excellent light stability and excellent appearance. The flame retardant shaped articles obtained from the resin composition of the present invention can be advantageously used in various fields, for example, housings, chassis or parts for household electric appliances, such as a VTR (video tape recorder), a distribution switchboard, a television set, an audio player, a condenser, a household plug socket, a cassette tape recorder, a videocassette, a video disk player, an air conditioner, a humidifier and an electric machine for providing heated air; housings, chassis or parts for office automation machines, such as a main frame (mechanical chassis) for a CD-ROM, a printer, a facsimile, a PPC (plain paper copier), a CRT (cathode-ray tube), a word processor, an office computer system, a floppy disk drive, a keyboard, a typewriter, an ECR (electronic cash resister), an electric calculator, a toner cartridge and a telephone; electric and electronic parts, such as a connector, a coil bobbin, a switch, a relay, a relay socket, an LED (light-emitting diode), a variable condenser, an AC (alternating current) adapter, a FBT high-voltage bobbin, a FBT case, a IFT coil bobbin, a jack, a volume shaft and motor parts; and parts for an automobile, such as an instrument panel, a radiator grille, a cluster, a speaker grille, a louver, a console box, a defroster garnish, an ornament, a fuse box, a relay case and a connector shift tape. Therefore, the present invention plays a significant role in these industrial fields.

What is claimed is:

1. process for imparting flame retardancy to a resin component (A) selected from the group consisting of an aromatic polycarbonate and a resin mixture of an aromatic polycarbonate and at least one organic polymer resin selected from the group consisting of aromatic vinyl polymers, olefin polymers, polyesters, polyamides, polyphenylene ethers and epoxy polymers, wherein said resin mixture has an aromatic polycarbonate content of 50% by weight or more, said process comprising adding to said resin component (A) a flame retardant (B) comprising at least one phenyl group-containing silicone compound having a linear configuration, and an additional flame retardant (C) comprising at least one member selected from the group consisting of a metal salt flame retardant, a phosphorus-containing flame retardant, a nitrogen-containing flame retardant, a silicon-containing flame retardant other than said silicone compound (B), an inorganic flame retardant and a fibrous flame retardant, said at least one phenyl group-containing silicone compound (B) comprising a polymer which is represented by the following formula (1):

wherein:
each of $R^1$ and $R^2$ independently represents a hydrogen atom, a methyl group, an ethyl group, a butyl group or a phenyl group;
each of $R^3$ and $R^4$ independently represents a hydrogen atom, a methyl group, an ethyl group, a butyl group, a phenyl group or a silicon-containing monovalent group comprising a silicon atom having bonded thereto at least one member selected from the group consisting of a hydrogen atom, a methyl group, an ethyl group, a butyl group and a phenyl group;
at least one of $R^1$, $R^2$, $R^3$ and $R^4$ is a phenyl group; and
n is 100 or more in terms of the number average n value,
wherein the recurring units, each represented by the following formula (3):

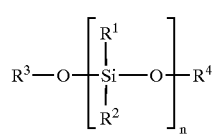

wherein each of $R^1$ and $R^2$ is as defined for formula (1), are the same or different, so that said flame retardant (B) is a homopolymer or a copolymer, wherein said copolymer has a random, a block or an alternating configuration,
wherein said flame retardant (B) contains said phenyl group in an amount of from 60 to 90 mole %, based on the total molar amount of $R^1$, $R^2$, $R^3$ and $R^4$;
wherein said flame retardant (B) is added in an amount of from 0.1 to 10 parts by weight and said additional flame retardant (C) is added in an amount of from 0.001 to 100 parts by weight, each relative to 100 parts by weight of said resin component (A).

2. The process according to claim 1, wherein said resin component (A) is said resin mixture.

3. The process according to claim 1, wherein said resin mixture has an aromatic polycarbonate content of 70% by weight or more.

4. The process according to claim 1, wherein said flame retardant (B) exhibits a kinematic viscosity of 100 centistokes or more as measured at 25° C. in accordance with JIS-K2410.

5. The process according to claim 1, further comprising adding a silicone compound containing an aromatic group in an amount of from 5 to less than 50 mole %, based on the total molars substituents.

6. The process according to claim 1, wherein said additional flame retardant (C) comprises 0.001 to 10 parts by weight of an organic sulfonic acid metal salt and 0.001 to 10 parts by weight of a polytetrafluoroethylene.

7. The process according to claim 1, wherein said additional flame retardant (C) is a phosphorus-containing flame retardant which is at least one member selected from the group consisting of methylneopentyl phosphite, pentaerythritol diethyl diphosphite, methyl neopentyl phosphonate, dineopentyl hypophosphite, phenylpyrocatechol phosphite, and dipyrocatechol hypodiphosphate.

* * * * *